(12) United States Patent
Sahita et al.

(10) Patent No.: US 9,626,508 B2
(45) Date of Patent: Apr. 18, 2017

(54) PROVIDING SUPERVISOR CONTROL OF CONTROL TRANSFER EXECUTION PROFILING

(71) Applicant: Intel Corporation, Santa Clara, CA (US)

(72) Inventors: Ravi L. Sahita, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 14/518,483

(22) Filed: Oct. 20, 2014

(65) Prior Publication Data

US 2016/0110269 A1    Apr. 21, 2016

(51) Int. Cl.
*G06F 21/53*   (2013.01)
*G06F 12/14*   (2006.01)
(Continued)

(52) U.S. Cl.
CPC ............... *G06F 21/53* (2013.01); *G06F 9/44* (2013.01); *G06F 11/0712* (2013.01);
(Continued)

(58) Field of Classification Search
CPC ............... G06F 11/1484; G06F 11/301; G06F 11/0778; G06F 9/44; G06F 12/14
See application file for complete search history.

(56) References Cited

U.S. PATENT DOCUMENTS 5,826,055 A   10/1998  Wang et al.
6,996,677 B2   2/2006  Lee et al.
(Continued)

FOREIGN PATENT DOCUMENTS

EP     2867843      5/2015
WO     2014005067   1/2014

OTHER PUBLICATIONS

U.S. Appl. No. 14/518,507, filed Oct. 20, 2014, entitled "Attack Protection for Valid Gadget Control Transfers," by Vedvyas Shanbhogue, et al.

(Continued)

*Primary Examiner* — Bryce Bonzo
*Assistant Examiner* — Jonathan Gibson
(74) *Attorney, Agent, or Firm* — Trop, Pruner & Hu, P.C.

(57) ABSTRACT

In one embodiment, an apparatus includes a control transfer termination (CTT) state machine configured to raise a fault when an indirect control transfer instruction of a process is not terminated by a CTT instruction. A virtual machine monitor (VMM) is configured to selectively enable the CTT state machine for the process. In addition, a binary translation engine is configured to receive fault information associated with a fault raised by the CTT state machine, provide at least some of the fault information to a security agent associated with the process, and responsive to direction from the security agent, to translate a code block of the process to a translated code block including a first CTT instruction associated with the indirect control transfer instruction, such that when the translated code block including the indirect control transfer instruction and the first CTT instruction is to be executed, the CTT state machine will not raise a fault. Other embodiments are described and claimed.

20 Claims, 16 Drawing Sheets

(51) Int. Cl.
*G06F 9/44* (2006.01)
*G06F 11/07* (2006.01)

(52) U.S. Cl.
CPC ...... *G06F 11/0721* (2013.01); *G06F 11/0766* (2013.01); *G06F 12/14* (2013.01); *G06F 2201/815* (2013.01)

(56) References Cited

U.S. PATENT DOCUMENTS

| | | | |
|---|---|---|---|
| 7,581,089 B1 | 8/2009 | White | |
| 7,987,451 B1 | 7/2011 | Dalcher et al. | |
| 8,434,073 B1 * | 4/2013 | Satish | G06F 21/54 717/120 |
| 8,468,600 B1 * | 6/2013 | Kaskel | G06F 21/53 726/22 |
| 8,555,077 B2 | 10/2013 | Davis et al. | |
| 8,613,084 B2 | 12/2013 | Dalcher | |
| 8,688,980 B2 | 4/2014 | Davis et al. | |
| 8,689,350 B2 | 4/2014 | Davis et al. | |
| 8,713,704 B2 | 4/2014 | Davis et al. | |
| 8,813,085 B2 | 8/2014 | Glew et al. | |
| 8,869,241 B2 | 10/2014 | Davis et al. | |
| 8,930,714 B2 | 1/2015 | Glew et al. | |
| 8,943,313 B2 | 1/2015 | Glew et al. | |
| 8,955,111 B2 | 2/2015 | Glew et al. | |
| 9,015,860 B2 | 4/2015 | Davis et al. | |
| 9,083,687 B2 | 7/2015 | Davis et al. | |
| 9,098,608 B2 | 8/2015 | Glew et al. | |
| 9,170,843 B2 | 10/2015 | Glew et al. | |
| 9,298,900 B2 | 3/2016 | Davis et al. | |
| 9,348,985 B2 | 5/2016 | Davis et al. | |
| 9,443,085 B2 | 9/2016 | Glew et al. | |
| 2003/0097587 A1 * | 5/2003 | Gulick | G06F 21/575 726/34 |
| 2007/0136565 A1 | 6/2007 | Lambrache et al. | |
| 2009/0077544 A1 * | 3/2009 | Wu | G06F 21/56 717/160 |
| 2012/0167120 A1 | 6/2012 | Hentunen | |
| 2013/0024676 A1 | 1/2013 | Glew et al. | |
| 2013/0024867 A1 | 1/2013 | Glew et al. | |
| 2013/0024939 A1 | 1/2013 | Glew et al. | |
| 2013/0036314 A1 | 2/2013 | Glew et al. | |
| 2013/0036464 A1 | 2/2013 | Glew et al. | |
| 2013/0081043 A1 | 3/2013 | Glew et al. | |
| 2013/0133054 A1 | 5/2013 | Davis et al. | |
| 2013/0151515 A1 | 6/2013 | Davis et al. | |
| 2013/0151617 A1 | 6/2013 | Davis et al. | |
| 2013/0159217 A1 | 6/2013 | Davis et al. | |
| 2013/0159413 A1 | 6/2013 | Davis et al. | |
| 2013/0160087 A1 | 6/2013 | Davis et al. | |
| 2013/0160121 A1 | 6/2013 | Yazdani | |
| 2013/0191887 A1 | 7/2013 | Davis et al. | |
| 2013/0197968 A1 | 8/2013 | Davis et al. | |
| 2014/0123249 A1 | 5/2014 | Davis et al. | |
| 2014/0156972 A1 | 6/2014 | Shanbhogue et al. | |
| 2015/0020075 A1 | 1/2015 | Glew et al. | |
| 2015/0128262 A1 | 5/2015 | Glew et al. | |

OTHER PUBLICATIONS

PCT Application Serial No. PCT/US13/57064, filed Aug. 28, 2013, entitled "Hardware and Software Execution Profiling," by Intel Corporation.

Dino A. Dai Zovi, "Practical Return Oriented Programming," Apr. 2010, 68 pages.

U.S. Appl. No. 14/039,663, filed Sep. 27, 2013, entitled "Using Software Having Control Transfer Termination Instructions With Software Not Having Control Transfer Termination Instructions," by Vedvyas Shanbhogue, et al.

* cited by examiner

400

PROVIDING SUPERVISOR CONTROL OF CONTROL TRANSFER EXECUTION PROFILING

TECHNICAL FIELD

Embodiments relate to providing protection against malware or other computer system security attacks.

BACKGROUND

Return-oriented programming (ROP) is a computer security exploit technique in which an attacker uses software control of a stack to execute an attacker-chosen sequence of machine instructions. These clusters of instructions typically end with a programmer-intended or unintended return (RET) instruction within existing program code. The intended or unintended RET instruction transfers execution to the attacker-chosen return address on the stack and allows the attacker to retain execution control through the program code, and direct execution to the next set of chosen sequence of instructions to achieve the attacker's intent. The clusters of attacker-chosen instruction sequences are referred to as gadgets.

Often the executed gadget includes only several assembler instructions followed by a RET instruction that can already perform a well-defined attack operation. By chaining together a set of these gadgets such that the RET instructions from one gadget lands into the next gadget and so on, the malware writer is able to execute a complex algorithm without injecting any code into the program. Some of these instruction sequences ending in a RET can be found in functions compiled into the program or libraries.

Thus the ROP technique involves delivering a payload having a set of chained list of pointers to gadgets and parameters to a data memory of a program using vulnerabilities like stack buffer overflows. The exploit also overwrites the return address of the vulnerable function that was used to perform the stack buffer overflow to point to the first gadget in the sequence. When this vulnerable function executes a RET instruction, control transfers to the first gadget instead of the function caller. This gadget may then consume one or more data elements from the stack payload. Using this exploit type, the malware writer is able to change the control flow of the program by causing a control transfer to a non-programmer intended location in the program (e.g., to the middle of an instruction).

A ROP attack technique uses various characteristics of an x86 instruction set architecture (ISA): variable length and unaligned instruction encoding; large and dense ISA encoding; a stack holding control and data information; and a single byte opcode RET instruction. Current techniques to defend against such attacks may be ineffective and have various shortcomings.

DETAILED DESCRIPTION

Figure 1:
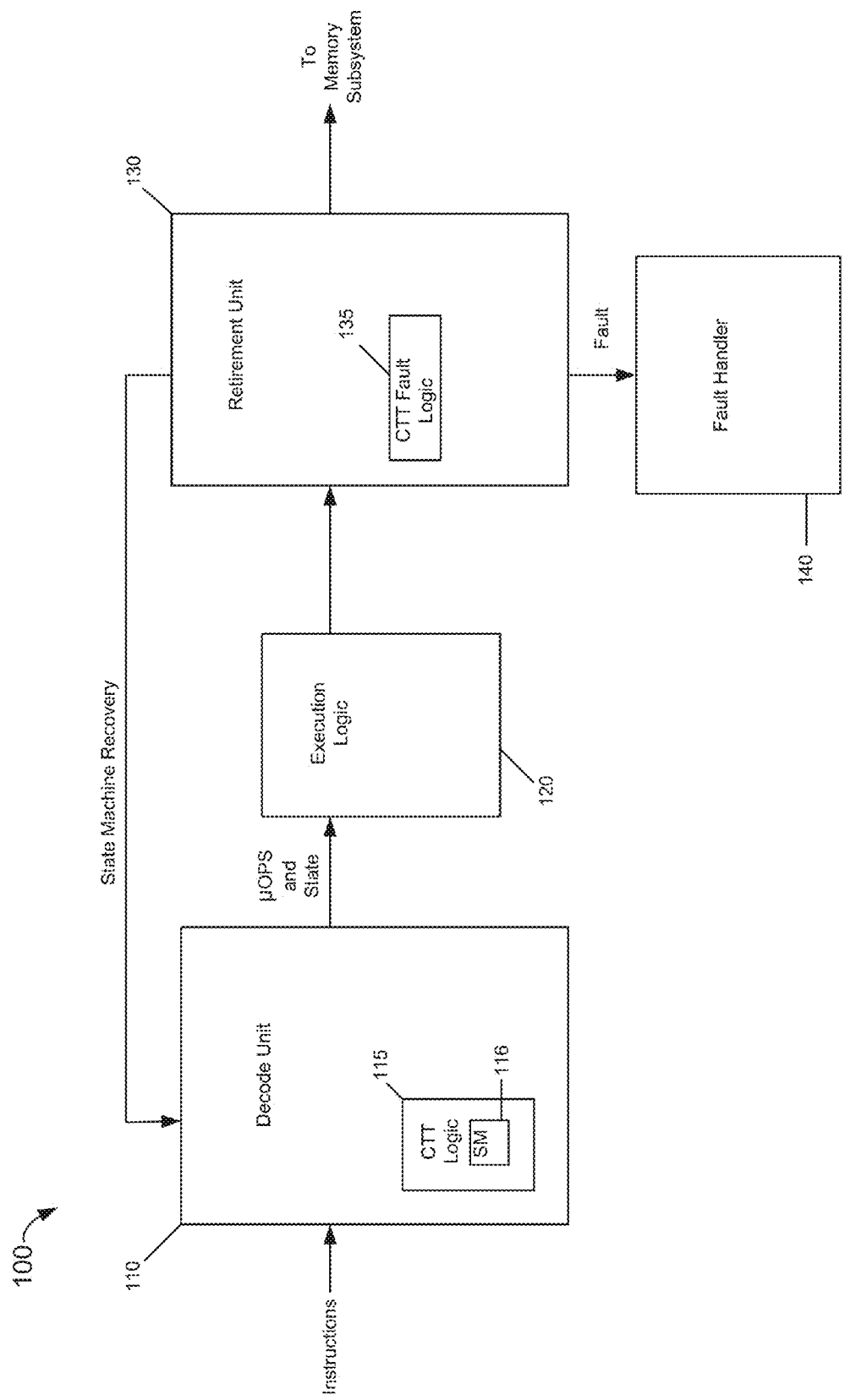
FIG. 1 is a block diagram of a portion of a processor in accordance with an embodiment of the present invention.

Embodiments provide a set of instruction set architecture (ISA) instructions that enable a processor to determine whether a control transfer instruction is directed to an appropriate target, and if not to take action to prevent instructions beyond the control transfer instruction from being committed to the architectural state of the processor. In this way, at least certain unintended control transfers within a program can be eliminated, constraining the number of gadgets that a malware writer can use.

More specifically, embodiments provide a set of control transfer termination (CTT) instructions to allow software to specify valid control transfer terminating points in a program such that hardware can enforce control transfers to occur to only programmer-intended locations. These CTT instructions perform this enforcement with minimal performance and energy impacts to the program. The CTT ISA extensions can thus mitigate the execution of unintended gadgets in programs.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the ISA may be implemented by one or more micro-architectures, which include processor logic and circuits used to implement one or more instruction sets. Accordingly, processors with different micro-architectures can share at least a portion of a common instruction set. For example, Intel® Pentium 4 processors, Intel® Core™, and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

In one embodiment, an instruction may include one or more instruction formats. Such instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

A first CTT instruction, referred to herein as an ENDBRANCH instruction, is used to identify valid locations in a program where a control transfer may be validly performed using an indirect CALL or an indirect jump (JMP) instruction. A second CTT instruction, referred to herein as an ENDRET instruction, is used to identify valid locations in a program where a control transfer may be validly performed using a RET instruction.

In an embodiment, these instructions have the following characteristics: they are 4 byte opcodes chosen such that they do not naturally occur in programs; and they are defined as no operation (NOP) currently in the x86 ISA to allow programs compiled with ENDBRANCH/ENDRET instructions to execute on earlier generation processors.

Although the scope of the present invention is not limited in this regard in an embodiment, these CTT instructions may have a general form that includes a multi-byte opcode. In one such implementation these CTT instructions may be represented by a four-byte opcode that corresponds to an opcode value not presently existing in the current x86 ISA. Beyond this opcode, there may be no additional encoding for the instruction, since the instruction executes as a no operation within an execution logic. As such there is no identification of a source operand, destination operand or immediate value to be associated with the instruction.

Referring now to FIG. 1, shown is a block diagram of a portion of a processor in accordance with an embodiment of the present invention. As shown in FIG. 1, portion 100 of the processor includes various portions of a pipelined processor such as an in-order or out-of-order processor. As seen, incoming instructions which may be macro-instructions of a given ISA are provided to a decode unit 110 that is configured to decode the instructions, e.g., into one or more smaller instruction such as micro-operations (µops).

As seen, decode unit 110 includes a CTT logic 115 in accordance with an embodiment of the present invention. In general, CTT logic 115 may analyze each incoming instruction and determine whether the instruction is associated with a control transfer. If so, CTT logic 115 may associate certain state information with one or more µops. This state indicates a state of a state machine 116 that is modified by decoding of at least certain control transfer and control transfer termination instructions. If instead the instruction is not associated with a control transfer, a different state may be associated with the one or more µops.

More specifically, when an incoming instruction is a control transfer instruction, a transition of state machine 116 within CTT logic 115 may occur to pass from an idle state to a given wait state. Furthermore, to reflect this wait state, a given encoding can be associated with the one or more µops decoded from the incoming control transfer instruction. If a next incoming instruction is a control transfer termination instruction that immediately follows the control transfer termination, then state machine 116 may return to the idle state and associate a given encoding with the decoded one or more µops. As will be discussed, if a control transfer instruction is not immediately followed by a control transfer termination instruction, CTT logic 115 may insert a fault µop into the processor pipeline (and the state machine may remain in a wait state).

Otherwise, if state machine 116 is in an idle state and an incoming instruction does not relate to a control transfer (or termination), an encoding of idle state information may be associated with the one or more µops to indicate that state machine 116 remains in the idle state.

Thus as seen in FIG. 1, decode unit 110 outputs a stream of µops and associated state information to indicate a state of state machine 116 within CTT logic 115. These µops and state information may be provided to an execution logic 120, which can include various types of units including arithmetic logic units (ALUs), floating point units and so forth that thus execute operations indicated by the stream of µops. In an embodiment, the CTT instructions only control the state transitions in state machine 200, and in an execution logic of the processor these instructions execute as NOP and do not cause any change in the program semantics.

In turn, results of the µops are provided to a retirement unit 130 configured to determine whether given operations were successfully performed and to retire them if so, and otherwise to raise a fault or exception if an undesired condition occurs as a result of the execution. In an out-of-order processor, retirement unit 130 may further operate to reorder instructions which may be executed in any order, back into program order. When instructions properly retire, they may be provided to further portions of a processor such as a memory subsystem.

As further seen in FIG. 1, retirement unit 130 includes a CTT fault logic 135 which may be configured to determine whether appropriate behavior occurs with regard to control transfer instructions. More specifically, CTT fault logic 135 may operate to raise a fault when a given control transfer instruction to be retired is not directly followed by an appropriate control transfer termination instruction, as described herein. In an embodiment, this determination may be based at least in part on an inserted fault µop and the state information communicated with the µops exiting from decode unit 110. If a CTT fault µop is detected, a fault is raised and is communicated to a fault handler 140, which may take various actions in accordance with a given handler to resolve the faulting behavior. Thus in an embodiment, when a next instruction presented to retire after a control transfer instruction is not an appropriate CTT instruction, retirement unit 140 may deliver a fault responsive to this CTT fault μop by delivering a fault-class exception (e.g., a general protection fault) such that that instruction does not retire.

Still referring to FIG. 1, in the case where a misprediction occurs and instructions are to be re-executed according to a correct branch, retirement unit 130 may communicate via a feedback path with decode unit 110 to thus provide an indication of a proper branch or other code flow to be taken. Still further, via this feedback path a state machine recovery signal can be communicated such that state machine 116 of CTT logic 115 can be placed into an appropriate state to reflect this change in program flow. Stated another way, when a fault μop is present in a mispredicted path, a fault is not raised due to this misprediction and accordingly the state machine recovery signal may cause state machine 116 to pass from a wait state back to an idle state or a wait state, and to also indicate the last successful instruction to retire, so that decode unit 110 can decode instructions of the correct branch. Although shown at this high level in the embodiment of FIG. 1, understand the scope of the present invention is not limited in this regard.

Figure 2:
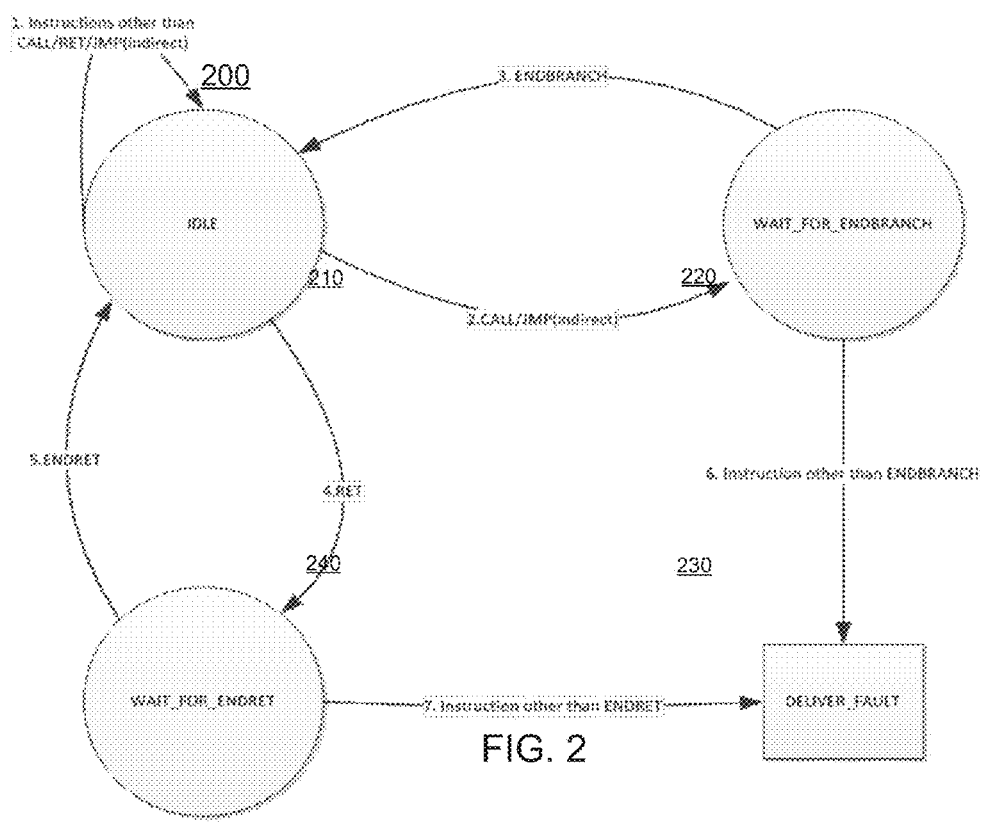
FIG. 2 is a block diagram of a state machine in accordance with an embodiment of the present invention.

Referring now to FIG. 2, shown is a block diagram of a state machine in accordance with an embodiment of the present invention. As shown in FIG. 2, state machine 200 may correspond to CTT state machine 116 of FIG. 1. State machine 200 begins operation in an IDLE state 210 into which the state machine is placed after reset of a processor.

When an indirect CALL or JMP instruction is decoded, the state machine enters the WAIT_FOR_ENDBRANCH state 220. If the next instruction that is decoded is not an ENDBRANCH instruction, then state machine 200 performs a DELIVER_FAULT operation 230 which causes generation of a fault μop (and state machine 200 may remain in the WAIT_FOR_ENDBRANCH state 220). If instead the next instruction to be decoded following a control transfer instruction is an ENDBRANCH instruction, state machine 200 transitions back to the IDLE state 210.

When a RET instruction is decoded, state machine 200 enters the WAIT_FOR_ENDRET state 240. If the next instruction that is decoded is not an ENDRET instruction, state machine 200 performs the DELIVER_FAULT operation 230. If the next instruction that is decoded is an ENDRET instruction, state machine 200 transitions back to the IDLE state 210.

Interrupts/exceptions/traps and VM exits that occur when state machine 200 is in the WAIT_FOR_ENDBRANCH or WAIT_FOR_ENDRET states cause a transition of the state machine to the IDLE state instead of the DELIVER_FAULT state (not shown for ease of illustration in FIG. 2). This is so, as the fault delivered due to the target of the indirect CALL, JMP or RET is higher priority than any faults caused by the target instruction itself (e.g., #NM, #GP due to various conditions like alignment checks, canonical checks, etc.) or any VM exits caused due to the target instruction being a VM exiting instruction (e.g., exiting on XGETBV, CPUID, etc.). This operation ensures that these asynchronous events do not cause unintended exceptions. Because these events are asynchronous to normal program execution, an attacker cannot realistically force them to be delivered after the CALL, JMP or RET, and thus they are not an effective way for an attacker to bypass the ROP security.

Enabling CTT additionally has the following effects, in an embodiment: interrupt returns (IRET) are disallowed and undefined (#UD) in a user level (e.g., ring 3) to prevent their use for building ROP gadgets; a μop to flags register instruction (POPF) does not update the trap flag (TF) bit in the system flags when executed at ring 3, which prevents an attacker from causing a #DB deterministically by using a POPFs instructions RET gadget, because exception will transition the state machine to the IDLE state.

State machine 200 thus enforces the following rules: the instruction at the target of a RET instruction must be an ENDRET instruction and the instruction at the target of an indirect CALL or indirect JMP instruction must be an ENDBRANCH instruction. If these rules are violated, then the violating instruction (the instruction at the target of a RET or CALL/JMP instructions) faults and is prevented from retiring.

Thus by placing ENDBRANCH and ENDRET instructions in a program at valid control transfer locations, a programmer or compiler can prevent unintended control transfers from happening. This placement of ENDBRANCH and ENDRET instructions is as illustrated below in Table 1, as an example:

TABLE 1

```
main( ) {
  int (*f)( );
  f = foo;
  f( );
}
int foo( ) {
  return
}
0000000000400513 <main>:
endbranch
push %rbp
mov %rsp,%rbp
sub $0x10, %rsp
movq $0x4004fb, -8(%rbp)
mov -8(%rbp), %rdx
mov $0x0, %eax
call *%rdx
endret
leaveq
retq
00000000004004fb <foo>:
endbranch
push %rbp
mov %rsp,%rbp
leaveq
retq
```

In this example, an ENDBRANCH instruction is placed as the first instruction in the subroutine foo and in the main program. And an ENDRET instruction is placed after the CALL instruction to subroutine foo. Thus there are now 3 valid control transfer points in this program. Specifically, in execution of the main program, a call instruction (call *%rdx) is executed, causing a control transfer to the subroutine foo. More specifically as seen, the first instruction in this subroutine is an ENDBRANCH instruction, such that a valid control transfer occurs and the CTT state machine thus proceeds from an IDLE state, to a WAIT_FOR_ENDBRANCH state and back to the IDLE state, without raising a fault.

Similarly, at the conclusion of the subroutine foo, a return instruction (RETQ) is executed, thus causing control to transfer to the first instruction after the calling instruction in the main program. Here, this instruction is an ENDRET instruction and as such, a valid control transfer occurs. In this case, the CTT state machine proceeds from the IDLE state, to the WAIT_FOR_ENDRET state, and thereafter back to the IDLE state, without raising a fault.

Thus using CTT in accordance with an embodiment of the present invention, a constraint is introduced that a ROP gadget be preceded with an ENDRET to be usable. As such, a significant reduction in the number of gadgets that can be harvested from a library is realized, and the quality of such gadgets is significantly lower in terms of functionality that these remaining gadgets expose, making ROP attacks harder to execute.

Figure 3A:
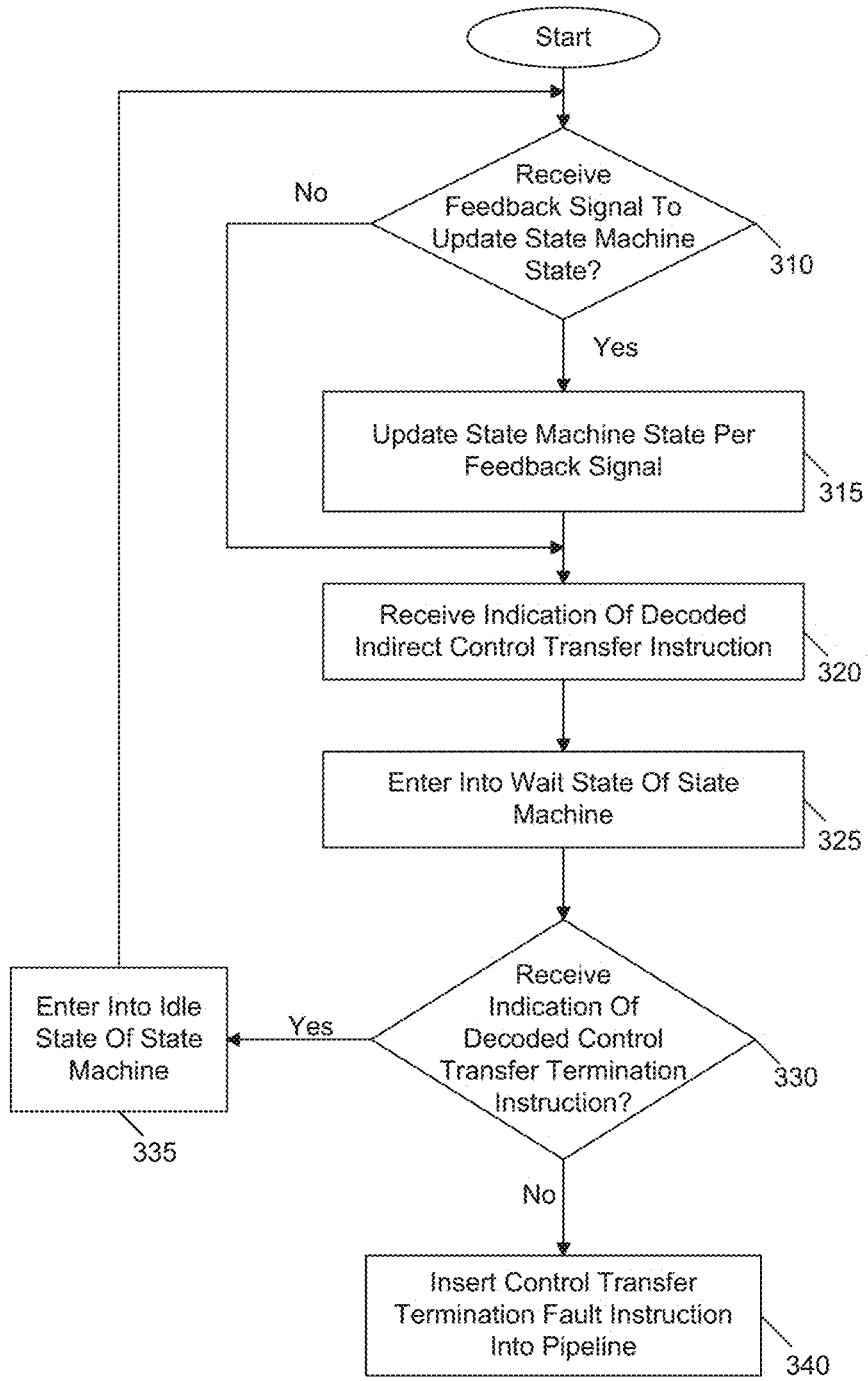
FIG. 3A is a flow diagram of a method in accordance with an embodiment of the present invention.

Referring now to FIG. 3A, shown is a flow diagram of a method in accordance with an embodiment of the present invention. As shown, method 300 may be performed by front end logic including a CTT state machine as described herein. Note that the operations shown in FIG. 3A relate to state machine operations for control transfer-related instructions. For other instructions, if the state machine is currently in the idle state, it remains there. As seen, method 300 begins by determining whether a feedback signal is received to update the CTT state machine (diamond 310). In an embodiment, this feedback signal may be received from a retirement unit or fault handler to cause the state of the state machine to transition to a given state, e.g., due to a misprediction (as from a retirement unit) or responsive to resolving a fault (as from a fault handler). If such feedback signal was received, control passes to block 315 where the state machine is updated with the state communicated through this feedback signal.

From both of these cases, control passes next to block 320 where an indication that an indirect control transfer instruction such as a call, jump or return has occurred (assuming that the decode unit has decoded such an instruction). And as such, control passes to block 325 where a transition into a wait state of the state machine may occur.

Still referring to FIG. 3A, control next passes to diamond 330 where it can be determined whether an indication of receipt of a control transfer termination instruction is received. If so, control passes to block 335 where the idle state of the state machine be entered, as pursuant to this proper CTT instruction following the control transfer instruction a valid control transfer occurs.

If instead it is determined that next decoded instruction is not a control transfer termination instruction, control passes to block 340 where a control transfer termination fault instruction can be inserted into the processor pipeline. Note here that the state of the state machine does not change and thus remains in the selected wait state. In an embodiment, this fault instruction is a µop that travels through the processor pipeline and if it is selected for retirement, the retirement unit will cause a fault to enable an OS-based fault handler to execute to determine the cause of the fault and take appropriate action.

Figure 3B:
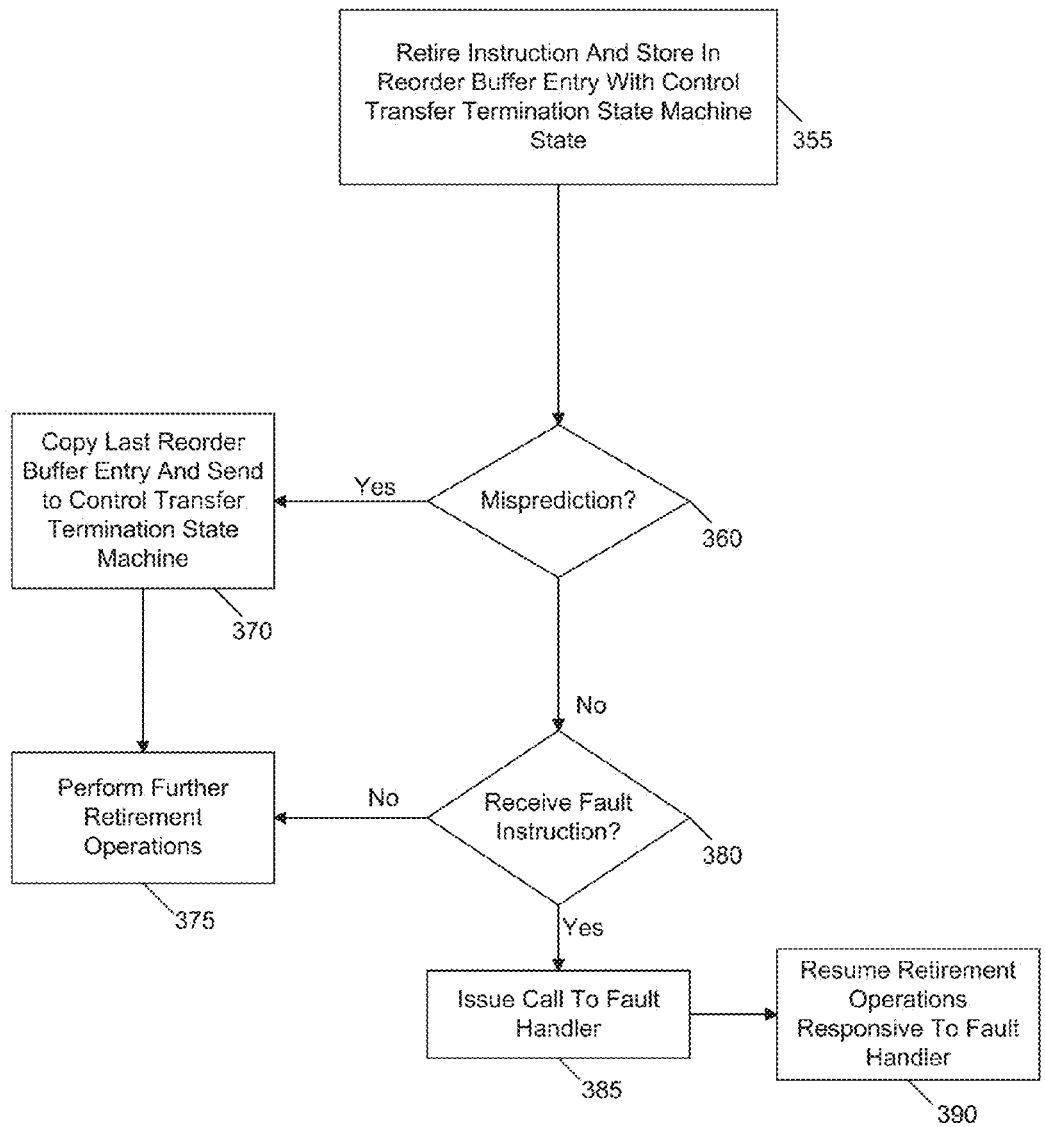
FIG. 3B is a flow diagram of another method in accordance with an embodiment of the present invention.

FIG. 3B is a flow diagram of another method in accordance with an embodiment of the present invention. Method 350 may be performed at least in part by logic of a retirement unit to handle CTT-based retirement operations. As seen, method 350 begins by retiring a given instruction and storing CTT state associated with the instruction (block 355). In an embodiment, this information may be stored in a given storage of the retirement unit such as reorder buffer entry. As will be discussed further below, this state can be used in case a misprediction occurs. Next control passes to diamond 360 to determine whether a misprediction has occurred. If so, control passes to block 370 where information regarding the last validly retired instruction present in an entry of the reorder buffer can be obtained and sent back to CTT logic (of the decode unit) to enable updating the state of the state machine into the appropriate state. There further typical retirement operations may continue (at block 375).

Referring still to FIG. 3B, if a fault instruction is received (diamond 380), control passes to block 385 where a call can be issued to a fault handler. As an example, an OS-based fault handler may be executed. As part of this fault handling when the fault is due to a CTT fault µop, a supervisor-based CTT state machine may be enabled and used to access the state of the user mode CTT state machine to determine the reason for fault and to act accordingly. As an example, a target instruction (namely a non-CTT target instruction) may be prevented from retiring and an appropriate correction mechanism may be performed. Or the fault handler may take any other action. As part of such operations, the fault handler may cause the user mode CTT state machine to be set to the appropriate state.

As further shown in FIG. 3B, after completion of the fault handler, retirement operations can be resumed responsive to control of the fault handler (block 390). Although shown at this high level in the embodiment of FIG. 3B is to be understood that the scope of the present invention is not limited in this regard.

With CTT instructions enforcing valid control transfer locations, software checks can be placed after these instructions to further check for valid control transfers using techniques like stack canaries. For the example discussed above, reference is made to Table 2:

TABLE 2

```
main( ) {
    foo( );
    endret;
    <detour/hook to anti-malware code
    to perform branch sanity check>
    . . .
}
int foo( ) {
    return
}
```

In the example above there is thus one place in the program (after the ENDRET) where such a check is to be placed. Without CTT, software cannot effectively check all places that can be used as gadgets as these gadgets can be crafted out of byte sequences in the middle of valid instructions.

The instrumentation of a program using CTT instructions may be performed by a compiler. In an embodiment, a just-in-time (JIT) compiler may perform the instrumentation of the CTT instructions. Alternately such instrumentation can be performed by rewriting the program binary to insert the CTT instructions using a binary rewriting tool that reconstructs the control flow graph from the application binary. The binary rewriting technique can be used in cases where the source of the binary is not available for recompilation. Such binary rewriting may also be done by anti-malware software using such tools.

In some cases, applications and libraries compiled with CTT instrumentation may be merged with libraries that are not compiled with CTT instrumentation, such non-CTT instrumented libraries referred to herein as "legacy libraries."

To support interworking with these legacy libraries, embodiments may provide additional instructions. In one such embodiment, a suppression instruction, referred to herein as a DISCTT instruction, is used to suppress the CTT state machine such that it stays in the IDLE state instead of transitioning to the WAIT_FOR_ENDBRANCH or WAIT_FOR_ENDRET states on an indirect CALL/JMP or RET, respectively. Additionally this instruction returns into a general purpose register the state of the CTT suppression at the time the instruction was issued. An enable instruction, referred to herein as an ENCTT instruction, is used to remove the suppression of the CTT state machine put in place by the DISCTT instruction such that the state machine enforces the CTT rules. Additionally this instruction returns the state of the CTT suppression at the time the instruction was issued.

The use of DISCTT and ENCTT instructions may be enabled for a process by an operating system. If the operating system does not allow a program to disable CTT, then the DISCTT instruction executes as a NOP and does not suppress CTT.

The use of the DISCTT and ENCTT instructions in a program to perform legacy interworking is illustrated below in Table 3:

TABLE 3

```
// Issue a DISCTT before invoking a legacy library function foo(
)
temp_variable = DISCTT;
foo( );
// If CTT was suppressed by DISCTT prior to this legacy library
call then un-suppress it
IF (temp_variable == NOT_SUPPRESSED)
    ENCTT;
ENDIF
```

Returning the previous state of CTT as a result of the DISCTT instruction allows for supporting call chains like below:

CTT_function1→legacy_function1→CTT_function2→legacy_function2

Here the CTT_function1 issues a DISCTT instruction before calling the legacy_function1. The DISCTT instruction returns the current state of CTT_functionality as NOT_SUPPRESSED and then suppresses the CTT_functionality. The legacy_function1 calls the CTT_function2. Now when the CTT_function2 calls legacy_function2, it again issues a DISCTT instruction. The DISCTT instruction now returns the current state of the CTT functionality as SUPPRESSED since it has been suppressed by CTT_function1. When the control returns from legacy_function2 to CTT_function2, it does not un-suppress the CTT functionality since it was already suppressed when it was invoked. When the control returns to CTT_function1, it un-suppresses the CTT_functionality using the ENCTT instruction since it was suppressed by that function.

Returning the previous state of CTT responsive to the ENCTT instruction allows for a CTT-enabled library function to be called by a non-CTT enabled library/application to un-suppress CTT before it starts executing and suppress CTT before returning to the caller, if it was suppressed when the function was called.

This is as illustrated below in Table 4:

TABLE 4

```
Legacy_function1( )
{
  CTT_function1( );
}
CTT_function1( )
{
  //ENDBRANCH is a NOP if this function was called with
CTT
  suppressed/disabled ENDBRANCH;
  // Un-suppress CTT. If already unsuppressed this is gratuitous
  temp_variable = ENCTT;
  ...
  ...
  ...
  // If CTT was suppressed when this function was called the
  suppress
```

TABLE 4-continued

```
  // it before returning
  IF ( temp_variable == SUPPRESSED )
    DISCTT;
  ENDIF
  RET;
}
```

Figure 4:
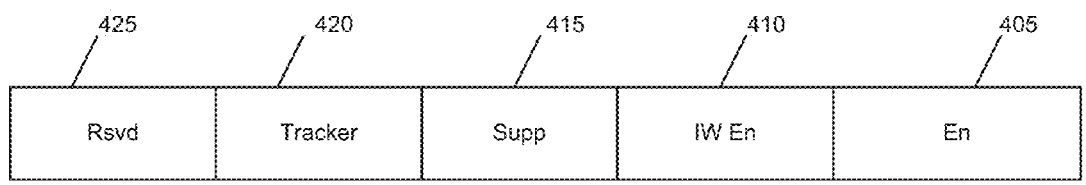
FIG. 4 is a block diagram of a configuration register in accordance with an embodiment of the present invention.

Referring now to FIG. 4, shown is a block diagram of a configuration register to store CTT state in accordance with an embodiment of the present invention. As shown in FIG. 4, configuration register 400 may include various fields to store state values used in performing CTT functionality. In an embodiment, two such configuration registers may be provided, with each register associated with a particular mode of operation. Stated another way, one configuration register may be used to control CTT operation in a user mode (e.g., ring 3) while a second configuration register may be used to control CTT functionality in a supervisor mode (e.g., rings less than 3).

In the embodiment shown, configuration register 400 includes an enable field 405 to store an enable indicator to indicate whether CTT is enabled for the current privilege level. A legacy enable field 410 is used to store an indicator to indicate whether legacy interworking is enabled. A suppression field 415 is used to store a suppression indicator to indicate whether CTT faults and tracking are to be suppressed. A tracker field 420 is used to store a value of the CTT state machine. In an embodiment, this tracker field may be two bits where a value of 0 indicates the IDLE state, a value of 1 indicates the WAIT_FOR_ENDRET state, and a value of 2 indicates the WAIT_FOR_ENDBRANCH state. A reserved field 425 may be used for various extensions. Of course other fields may be present in other embodiments.

Figure 5:
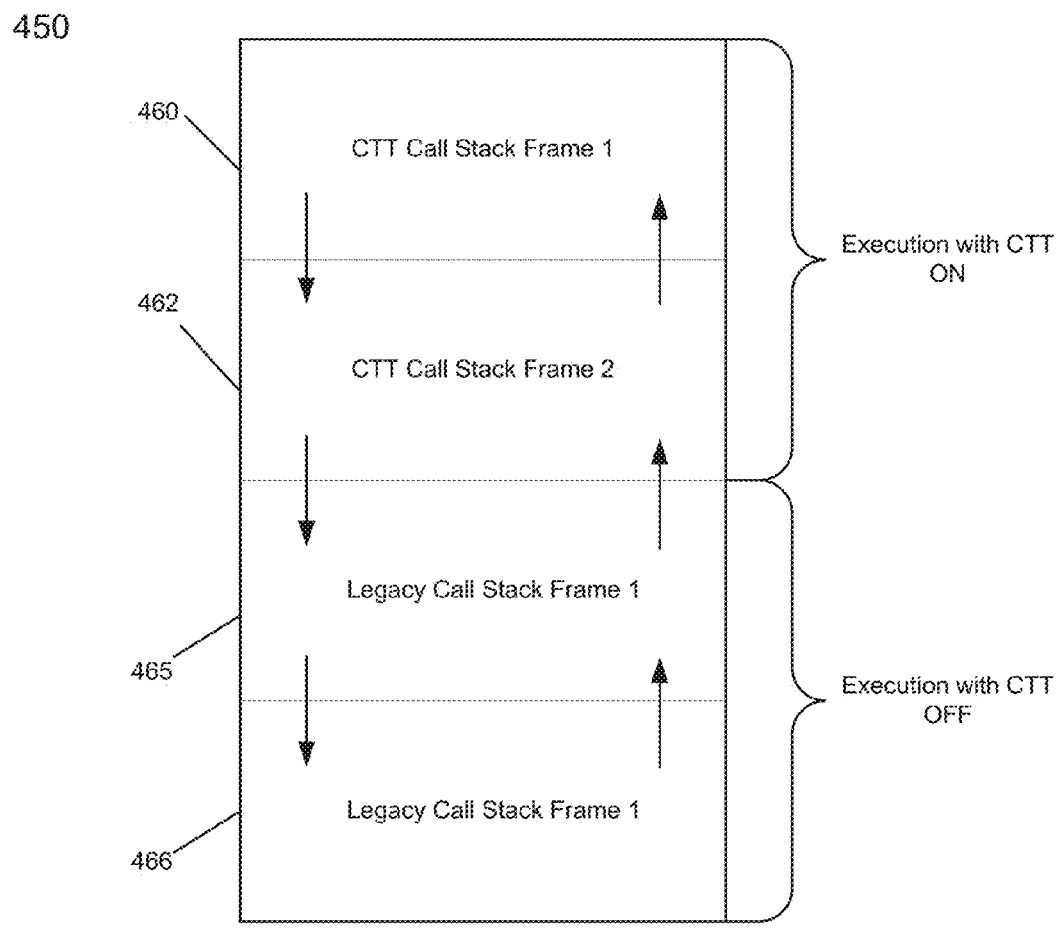
FIG. 5 is a block diagram of a call stack frame for code execution in accordance with an embodiment of the present invention.

Referring now to FIG. 5, shown is a block diagram of a call stack frame for code execution that interlaces CTT-enabled code and legacy code without CTT-enabled functionality. As shown in FIG. 5, a code segment 450 includes a first CTT call stack frame 460 and a second CTT call stack frame 462 that in turn calls a legacy call stack frame 465. Thus at the point of calling this legacy call stack frame, the CTT functionality is disabled responsive to a DISCTT instruction. Thus at this point execution begins with CTT functionality disabled for a first legacy call stack frame 465 and a second legacy call stack frame 466. Note that as the called functions return back, at the point of returning to call stack frame 462, execution with CTT functionality is re-enabled by an ENCTT instruction.

As such, FIG. 5 shows an example where a first transfer to legacy code suppresses CTT, which is done using indirect CALL/JMP instructions (not RET) for security reasons. Once CTT is suppressed by a DISCTT instruction, subsequent CALL/JMP/RET instructions can land on instructions other than ENDBRANCH/ENDRET without causing faults. CTT operation is unsuppressed when control returns to the point where suppression was done, via an ENCTT instruction.

Figure 6:
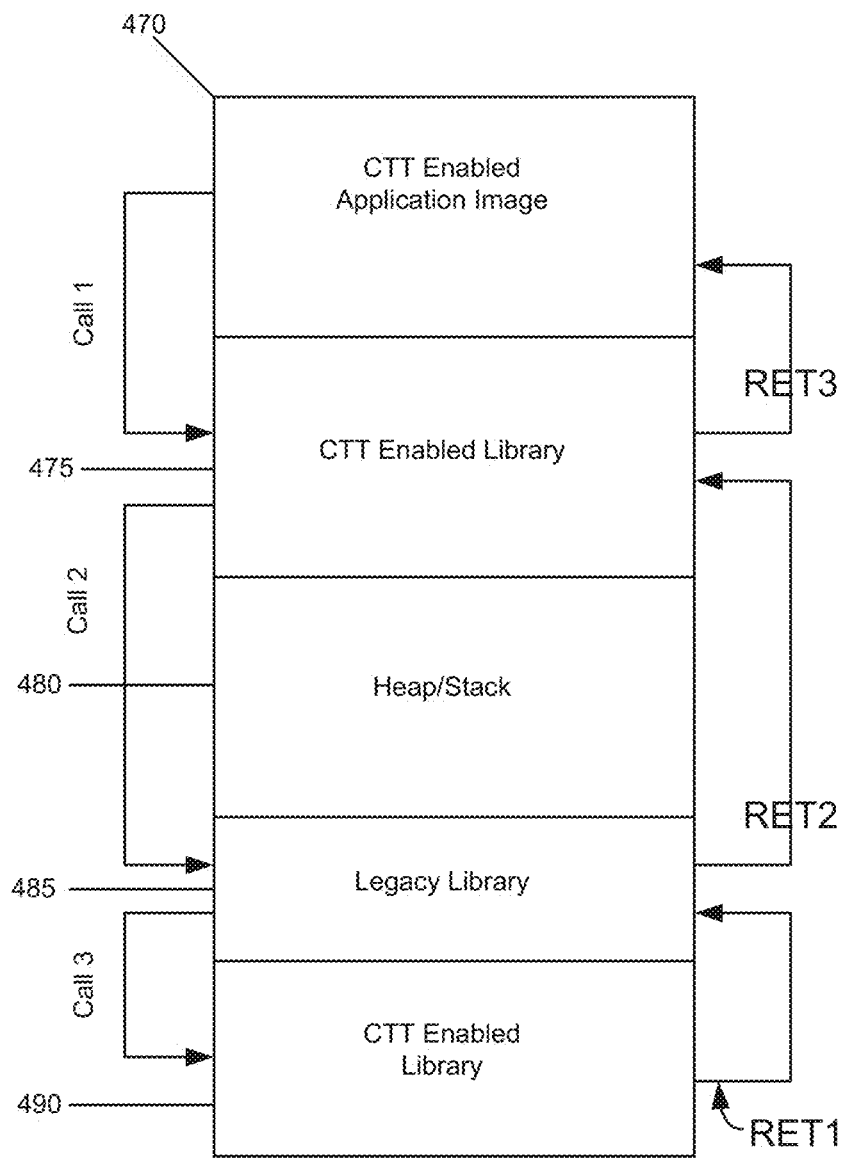
FIG. 6 is a block diagram of further details of legacy interworking in accordance with an embodiment of the present invention.

Referring now to FIG. 6, shown are further details of legacy interworking in accordance with an embodiment of the present invention. As shown in FIG. 6, an implementation is present with a CTT-enabled application image 470 that issues a call to a CTT enabled library 475 (Call1) that in turn initiates a call to a legacy library 485 (Call2). In turn, legacy library 485 issues a call to a second CTT-enabled library 490 (Call3). Also present is a heap/stack 480. After execution in second CTT-enabled library 490, control passes back to legacy library 485 (RET1), and from there control returns back to first CTT-enabled library 475 (RET2), and finally control returns back to application image 470 (RET3).

Note that upon Call2, a legacy transfer occurs and thus CTT is suppressed via a DISCTT instruction. Accordingly, for Call3, CTT remains suppressed, as it does for RET1. Finally, RET2 causes a return to the point of suppression and as such, CTT is unsuppressed via an ENCTT instruction. Note that this legacy interworking may be entered when a legacy interworking enable indicator of a CTT control logic is set and an indirect control transfer (namely a jump or call) occurs to a non-ENDBRANCH instruction.

The DISCTT and ENCTT instructions may be placed in the program by the programmer if she is aware of the interworking, and/or these DISCTT and ENCTT instructions may be placed in the program by the compiler/linker when it is linking statically to legacy libraries.

When linking dynamically to libraries, a loader or anti-malware software can insert trampoline functions between the application and the library, where the trampoline functions use DISCTT and ENCTT instructions. For example, calls to functions in a legacy library that are dynamically linked to a CTT enabled application go through a trampoline function, which suppresses CTT and then calls the legacy library function. The legacy library function returns to the trampoline function that un-suppresses CTT and returns to the CTT-enabled application.

Embodiments may be used by anti-malware software to wrap non-CTT binaries such that they can be used with CTT-enabled binaries. In addition, anti-malware software can restrict the use of the gadgets that can be found in the program even with CTT in use. Embodiments may be particularly applicable to mobile and other portable low power systems, in that software only techniques to mitigate against ROP (like rewriting binaries to remove all instances of RET by use of functionally equivalent but larger more complex sequences), generally lead to much larger binaries and increase the execution time of the program and thereby are not suited for mobile applications where power efficiency is a prime concern.

Figure 7:
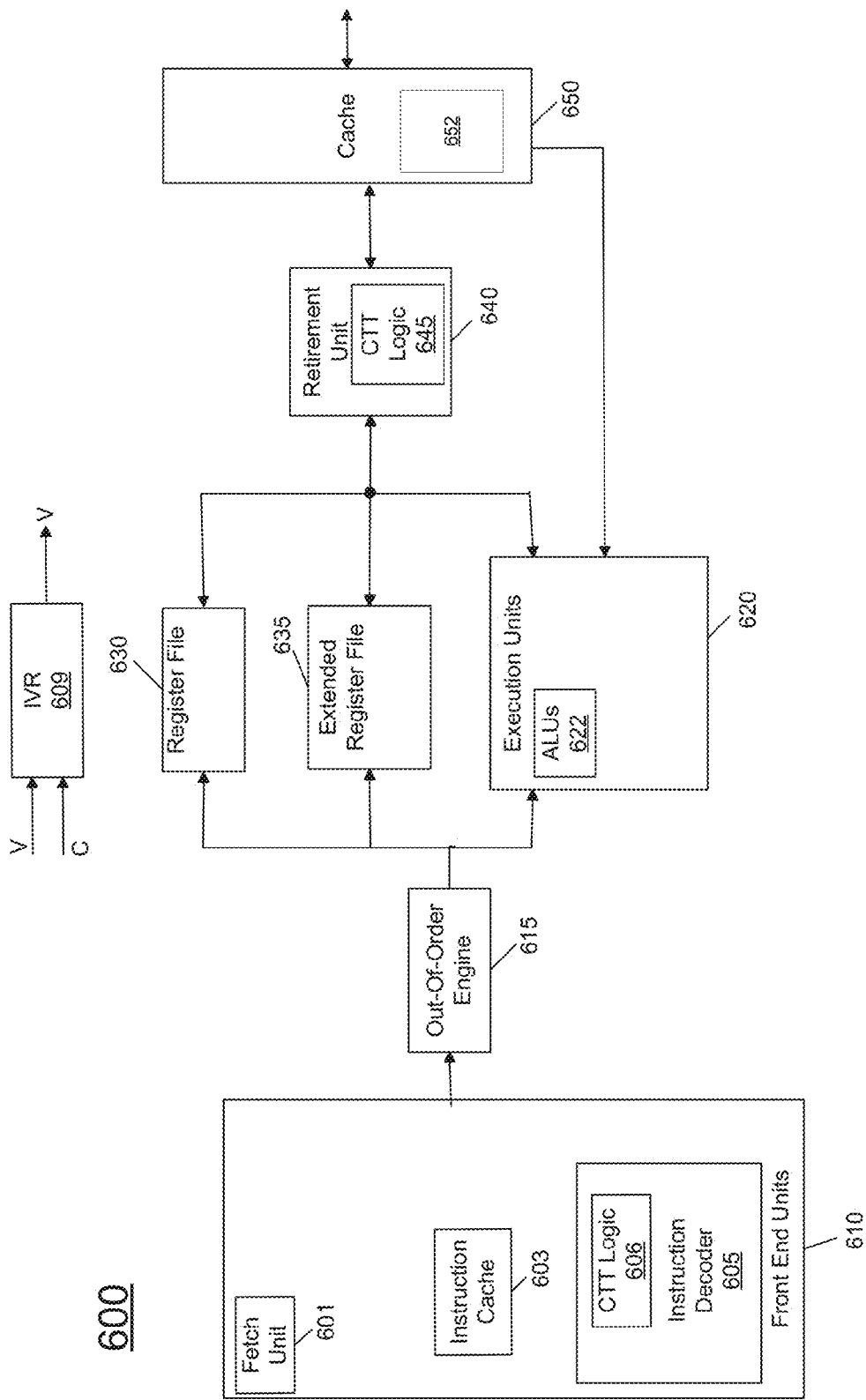
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 600 may be a multi-stage pipelined out-of-order processor. Core 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 600 may be a general-purpose processor, such as a Core™ i3, i5, i7, 2 Duo and Quad, Xeon™, Itanium™, XScale™ or StrongARIVI™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As shown in FIG. 7, core 600 may operate at various voltages and frequencies as a result of integrated voltage regulator 609. As seen in FIG. 7, core 600 includes front end units 610, which may be used to fetch instructions to be executed and prepare them for use later in the processor. For example, front end units 610 may include a fetch unit 601, an instruction cache 603, and an instruction decoder 605. Instruction decoder 605 includes CTT logic 606 in accordance with an embodiment of the present invention, with an associated CTT state machine to perform CTT operations as described herein. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to a retirement unit 640 including a reorder buffer (ROB). This ROB may include various arrays and logic to receive information associated with instructions that are executed. This information is then examined by retirement unit 640 to determine whether the instructions can be validly retired and result data committed to the architectural state of the processor, or whether one or more exceptions occurred that prevent a proper retirement of the instructions. Of course, retirement unit 640 may handle other operations associated with retirement. For retirement operations here, CTT logic 645 of the retirement unit may store CTT state machine state received with incoming instructions, and feedback this information responsive to a misprediction.

As shown in FIG. 7, retirement unit 640 is coupled to a cache 650 which in one embodiment may be a low level cache (e.g., an L1 cache), although the scope of the present invention is not limited in this regard. Also, execution units 620 can be directly coupled to cache 650. In the embodiment shown, a cache portion 652 may be allocated to store translated code portions instrumented with CTT instructions, as described further below. From cache 650, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of an ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
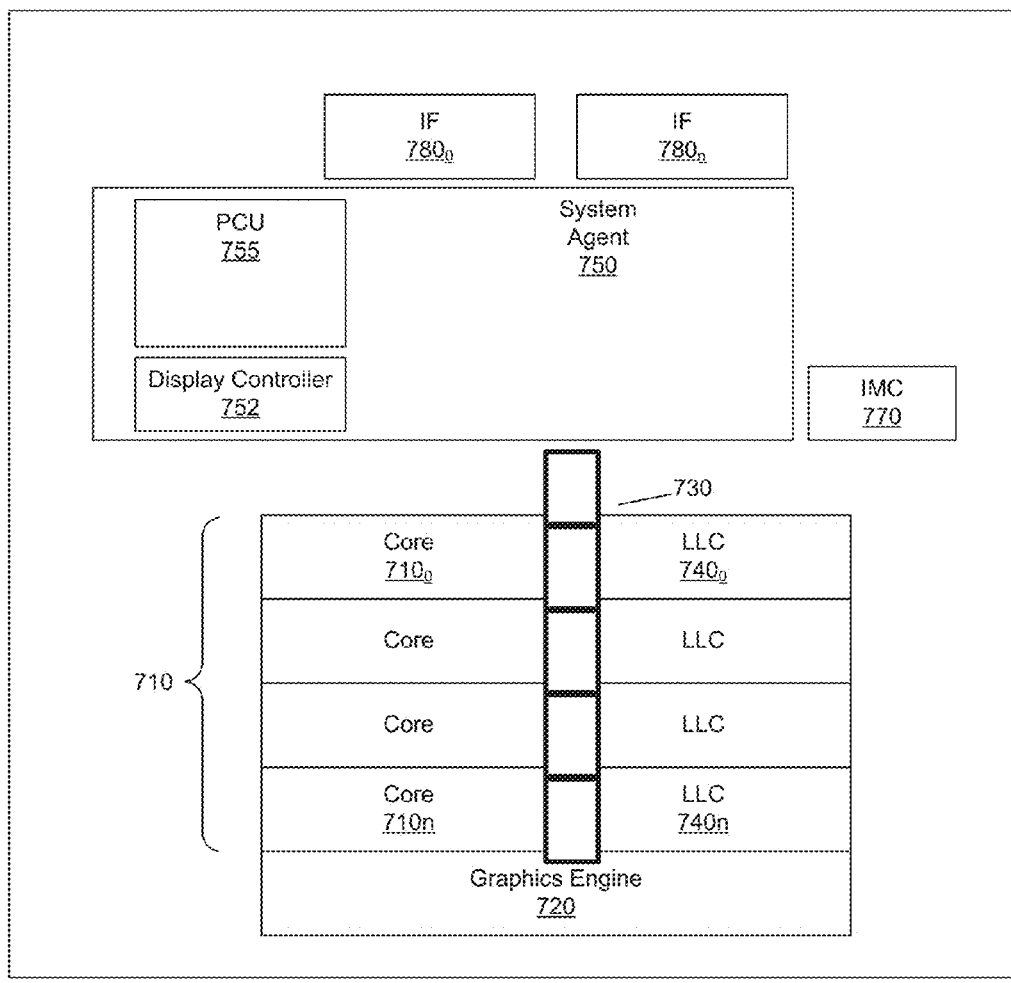
FIG. 8 is a block diagram of a multicore processor in accordance with an embodiment of the present invention.

Referring now to FIG. 8, shown is a block diagram of a multicore processor in accordance with an embodiment of the present invention. As shown in the embodiment of FIG. 8, processor 700 includes multiple domains. Specifically, a core domain 710 can include a plurality of cores $710_0$-$710_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 710 may further include low level caches in addition to various execution units and additional processing elements, including CTT logic as described herein. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755.

As further seen in FIG. 8, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

In various embodiments, a system supervisor may be used to manage control transfer termination monitoring. More specifically, in an embodiment a virtual machine monitor (VMM) may be used to perform VMM-assisted control flow integrity (v-CoFI) to dynamically enable and disable branch monitoring via handling of CTT instructions without any OS or application changes. As described above, CTT instructions may be used to track the behavior of control transfer instructions within a large attack surface (susceptible) program such as a browser or other program. Another example of such programs that may not be CTT enabled include legacy enterprise applications like custom databases that are no longer being maintained and lacking source code. Such CTT instructions enforce existing indirect branch instructions such as CALL and JMP instructions to transfer control to a first CTT instruction (e.g., ENDBRANCH) and a RET instructions to transfer control to a second CTT instruction (e.g., ENDRET).

Using an embodiment, indirect control transfers within a susceptible program can be monitored and enforced without modifications to the operating system or the application, in a highly performant manner. As examples, embodiments can be used to mitigate ROP attacks and new zero-day attacks in various user applications such as browsers, social media applications and so forth.

In a virtualized environment, when a transition occurs to transfer control from a virtual machine to the VMM (VM exit), the contents of the CTT supervisor state MSR is saved into a destination storage such as a VMCS structure and the CTT supervisor state is cleared. Thus the VMM execution starts with CTT operation disabled. Once in VMM control following a VM exit, the VMM can execute instructions to load the CTT supervisor state MSR with appropriate state information.

Thereafter on a subsequent return to the guest software (VM launch or resume), the supervisor mode CTT state for the guest OS is re-established from the value saved in the VMCS at the time of the exit to the VMM.

In an embodiment, the VMM uses a process identifier (e.g., a CR3 value) of a process in a virtual machine to track processes for which an anti-malware agent seeks to perform branch execution profiling. When a process that the VMM seeks to track is scheduled for execution, a VM exit occurs to the VMM. The VMM writes to the user mode CTT MSR to initialize CTT state to an ENABLED state, and resumes back to the virtual machine. At this point, CTT logic of the processor begins to track branches during user-level process execution. The VMM exits on any write to the CTT MSRs from the virtual machine to protect the CTT state. On a subsequent CR3 change that indicates that a new process is being scheduled, the VMM again obtains control and disables or swaps in the CTT state associated with that process (if it exists).

With the above model, if the application code is not CTT enabled, then an indirect branch triggers a CTT violation, which can be handled by a virtual interrupt service routine such as a virtual interrupt descriptor table (IDT) handler. In an embodiment, this routine or handler may be installed by a kernel anti-malware service. Such handler may be configured to obtain information regarding the control transfer, such as a snapshot of a destination sought to be executed by malware via a ROP attack. If the destination is determined to be an expected location of execution by the indirect transfer (e.g., as determined with reference to a policy), then the fault may be silently handled and execution continues at the requested destination. As an example, a valid control transfer within a process being executed may be a call to a dynamically linked library (DLL) routine. In an embodiment, the VMM can perform this ignore action for the CTT fault by clearing the CTT tracker state to an idle state.

In some embodiments, to reduce overhead incurred in handling potential fault instructions, a binary translation option may be provided. More specifically, embodiments may provide for a binary translation engine to dynamically translate code lacking appropriate CTT instructions to translated code including such instructions. Thus, if based on the above analysis, the location of a destination of a branch instruction was a valid location, the binary translation engine can be used to insert an appropriate CTT instruction (e.g., an ENDBRANCH instruction) so that subsequent branches to that location do not cause control violations. In an embodiment, this translated code may be stored in a cached location such as memory allocated from the operating system by the binary translation engine. Further, the memory page associated with the code may be made non-writable via a corresponding entry in an extended page table (EPT) so any attempts to modify the translated code can be detected by the VMM.

Figure 9:
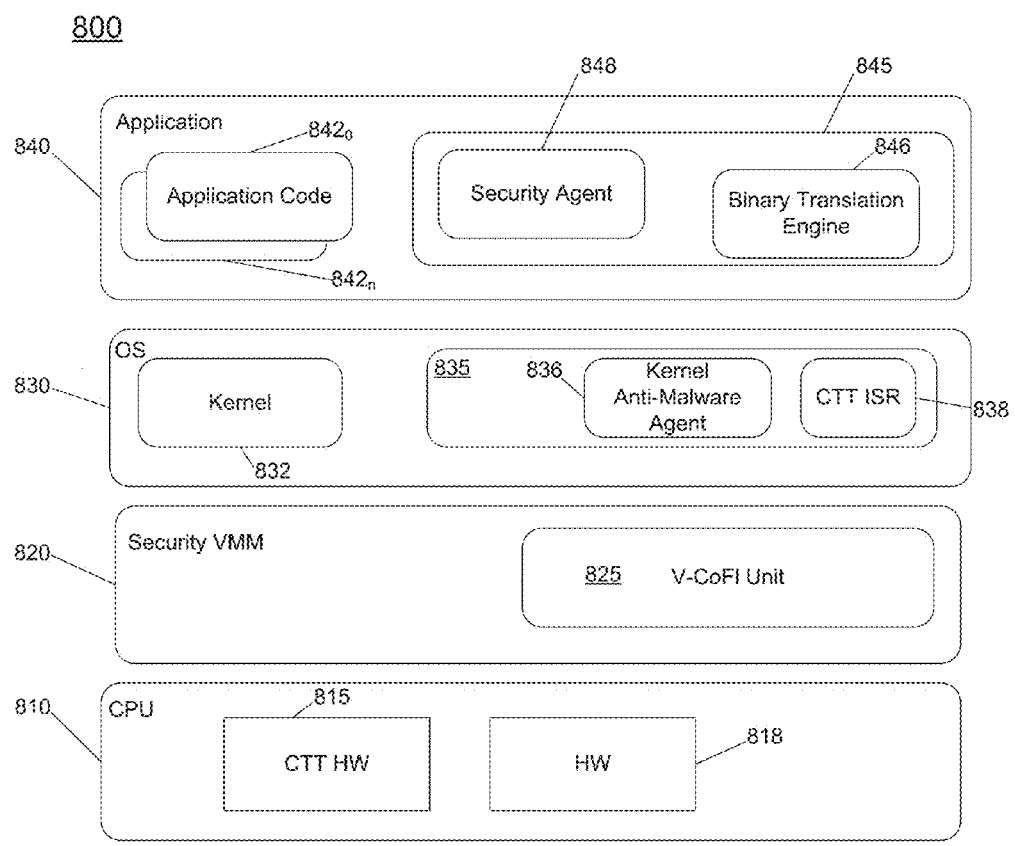
FIG. 9 is a block diagram of an arrangement of a computing system in accordance with an embodiment of the present invention.

Referring now to FIG. 9, shown is a block diagram of an arrangement of a computing system in accordance with an embodiment of the present invention. As seen, system 800 includes a processor 810, which in an embodiment may be a multicore processor or other central processing unit (CPU). Of course other typical system hardware often referred to as bare metal hardware including other processors, memory, storage, communication interfaces and so forth may be present in the system. As seen, processor 810 includes CTT hardware 815. Such hardware may include various configuration registers as described herein, in addition to CTT logic including one or more CTT state machines. In embodiments, processor 810 further includes hardware 818, which may include one or more cores, other processing engines, cache memories, uncore logic, a power management unit, one or more integrated voltage regulators, and so forth.

A software architecture executes on system 800. In the environment shown, a security VMM 820 is present and executes on the bare metal hardware. Note that in the illustration shown, security VMM 820 includes a virtual control flow integrity (v-CoFI) unit 825 to virtualize the CTT hardware resources to enable their use by multiple applications (e.g., guests or VMs) that execute under the VMM (and/or by the VMM itself). Note that only the security or trusted portion of the VMM is shown in FIG. 9. Understand however that an untrusted portion of the VMM may also be present.

An OS 830 executes under security VMM 820. As seen, OS 830 may be partitioned into an untrusted kernel portion 832 and a trusted OS portion 835, which may execute in an isolated environment such as a trusted execution environment (TEE) such that rogue software or a malicious user cannot access this trusted portion. To this end, CPU 810 includes secure execution technologies to set up a trusted execution environment, in which at least portions of the CTT handling may be performed. In different embodiments, the TEE may be implemented using Intel® SGX technology, Intel® TXT technology, or an ARM TrustZone. To this end, implementations may include various hardware, both general-purpose and specialized security hardware, to create a TEE for handling various secure operations.

As illustrated in FIG. 9, trusted OS portion 835 includes a kernel anti-malware agent 836 and a CTT interrupt service routine (ISR) 838. As will be described further herein, anti-malware agent 836 may be configured to receive a callback on initiation of a new process and perform interactions both with v-CoFI unit 825 and components of a trusted user space (described further below) to enable virtualized CTT operations to be initialized and triggered for a given process. In turn, CTT ISR 838 may be configured to receive information and control when a CTT fault is raised during execution and appropriately handle such faults.

As further illustrated in FIG. 9, an application layer or user space 840 is adapted under OS 830. In an embodiment, both OS 830 and applications within application layer 840 may take the form of a guest or virtual machine having access to the platform hardware intermediated by VMM 820. As illustrated, application layer 840 may include a plurality of application code segments $842_0$-$842_n$. In an embodiment, all such code segments may be processes of a single active application, or the code segments may be one or more processes each associated with a given application. As described herein, embodiments may provide for application code segments 842 to be monitored for proper CTT operation. Still further, such application code may be dynamically instrumented when the code lacks appropriate CTT programming to then enable such translated or instrumented code to be executed dynamically to improve performance and reduce overhead of CTT operations.

As illustrated, application layer 840 further includes a trusted application portion 845 including a binary translation engine 846 and a security agent 848. In general for purposes of discussion herein, binary translation engine 846 may, responsive to receipt of fault information from CTT ISR 838, perform a binary translation of a given code segment 842 to insert appropriate CTT instructions to provide a translated code portion (which may be stored in an appropriate cache memory, e.g., in binary translation engine 846 or at another location) to enable improved CTT operation. As further illustrated, binary translation engine 846 couples to a security agent 848. In general, security agent 848 may include policy-based information to indicate appropriate control transfers within corresponding application code segments 842 that may be used, e.g., by binary translation engine 846 to determine whether appropriate control transfers occur. Understand while shown at this high level in the embodiment of FIG. 9, the scope of the present invention is not limited in this regard and many variations and alternatives are possible.

During execution of a process using an environment as in FIG. 9, OS 832 loads a process into application layer 840. OS available process callbacks are utilized by kernel anti-malware agent 836 protected by security VMM 820. VMM 820 also allows anti-malware agent 836 to install CTT fault handler 838 in the kernel via an interrupt gate.

On process load, anti-malware agent 836 uses a kernel callback to record a PID or CR3 of the process initialized and tracks modifications to a memory map for the process (which may be used for anti-ROP policies enforced by user space components for the application). In turn, anti-malware agent 836 initializes appropriate anti-ROP policies in security agent 848 of user space 840 and, optionally, binary translation engine 846 for the application via dynamic load libraries. Both of these components may also be protected via the VMM managed memory views to avoid tamper or code injection into these components.

Next, kernel anti-malware agent 836 registers the process CR3 with v-CoFI unit 825 in VMM 820. V-CoFI unit 825 creates a CTT context for the process, and enables CTT ring-3 state for the guest OS (but this applies only to the ring-3 process being tracked currently). If v-CoFI unit 825 does not have CTT state for a given CR3, then the CTT state machine is de-activated until a monitored process is activated.

When the CTT state machine is active, any indirect control transfer instruction (e.g., BRANCH or RETURN) not terminated by an appropriate CTT instruction (e.g., ENDBRANCH or ENDRET) raises a CTT control fault. ISR 838 captures the relevant information from the exception stack regarding the source of fault. The current instruction pointer (RIP) provides the destination of the branch event. In an embodiment, ISR 838 can obtain the source instruction pointer (EIP) of the instruction (e.g., BRANCH) that caused the violation from a last exception record (LER) stored in a storage of CPU 810.

On such fault, CTT ISR 838 passes the relevant information to the active process handler in the application (namely binary translation engine 846 and security agent 848). In turn, BT engine 846 determines whether it has a cached policy for the destination of the event. In addition, BT engine 846 passes additional context to security agent 848, which checks against the loaded DLL entry points to determine whether the control transfer instruction was expected to land on the destination entry point. Optionally BT engine 846 may explicitly match a RETURN site to a previous CALL instruction as an additional heuristic.

If the control transfer location was valid, binary translation engine 846 may be configured to translate the code page and instrument CTT instructions into the translated code page to avoid subsequent control flow violations (unless the original code page was modified).

Note if the control transfer location was invalid (a policy violation), then security agent 848 can invoke kernel anti-malware agent 836 to capture additional information regarding process memory and invoke security VMM 820 to inject a general protection or other fault to the OS to terminate the process.

Note that a ROP attempt can still RETURN to an ENDRETURN-prefixed gadget. However this remaining attack vector can be addressed by instrumenting such terminal function return sites to allow an anti-malware service to check these returns against a protected stack maintained by the anti-malware service in its memory view. In still other cases, additional protections may be deployed by the translation engine, including instrumenting gadget sites with canary checks to detect return to middle of function attempts.

Figure 10:
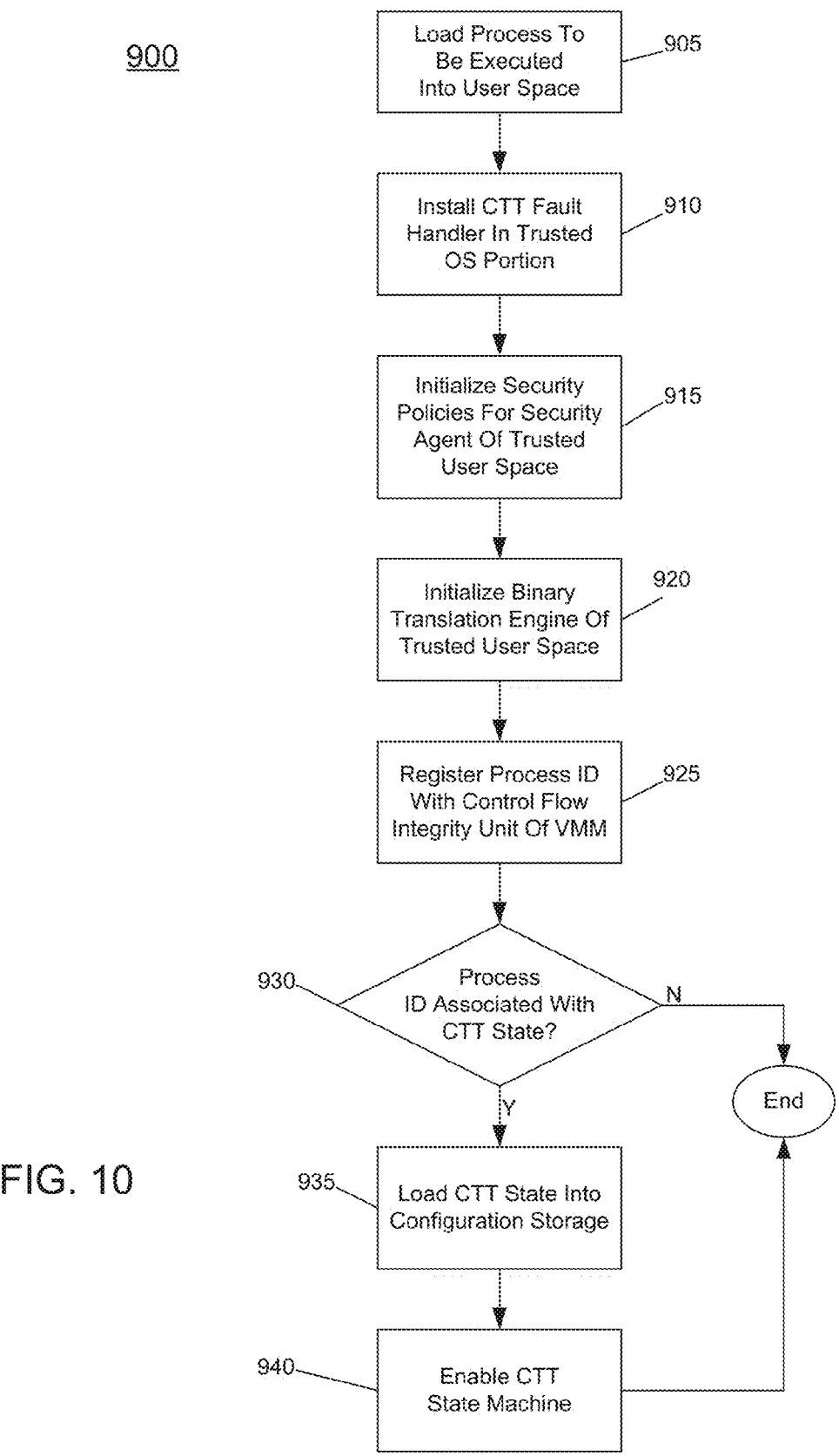
FIG. 10 is a flow diagram of a method for initializing a system for CTT operation in accordance with an embodiment of the present invention.

Referring now to FIG. 10, shown is a flow diagram of a method for initializing a system for CTT operation. To this end, various hardware and software including a security VMM, a trusted OS portion, user level components, and processor hardware, including CTT hardware and associated logic collectively may contribute to execution of method 900.

As seen, method 900 begins at block 905 in which a process to be executed is loaded into user space. Such process may be a given process of an application to be executed, such as a user application to be executed at a ring 3 level. Note that this process has a PID or CR3 value associated with it. At block 910, a CTT fault handler may be installed in a trusted portion of the OS. At block 915, security policies for a security agent of trusted user space may be initialized. As an example, security policies may provide information regarding appropriate control transfers within the application code as written, or other information such as a white list of applications that are allowed to be executed on this platform. Still referring to FIG. 10, next at block 920 a binary translation engine of the trusted user space may be initialized.

With further reference to FIG. 10, at block 925 a PID for the process may be registered with a control flow integrity unit of the VMM. In this way, at diamond 930 it can be determined, e.g., with reference to a table or other storage to that maps PIDs to CTT applicability, whether a CTT state already exists for a given process. If not, method 900 may conclude, as CTT operation with regard to the given process may not be desired, e.g., due to CTT tracking not being used for this process by user/administrator policy.

Still referring to FIG. 10, if it is determined at diamond 930 that there is associated CTT state, control passes to block 935 where the CTT state is loaded into a configuration storage, such as a CTT MSR. This CTT state may be obtained from an appropriate location, such as a portion of a VMCS associated with the given process or any other storage of the system. Finally, at block 940 the CTT state machine may be enabled. Thus at this point appropriate components of various layers of a hierarchy are configured for CTT operation during execution of a process. Understand while shown at this high level in the illustration of FIG. 10, variations and alternatives are possible.

Figure 11:
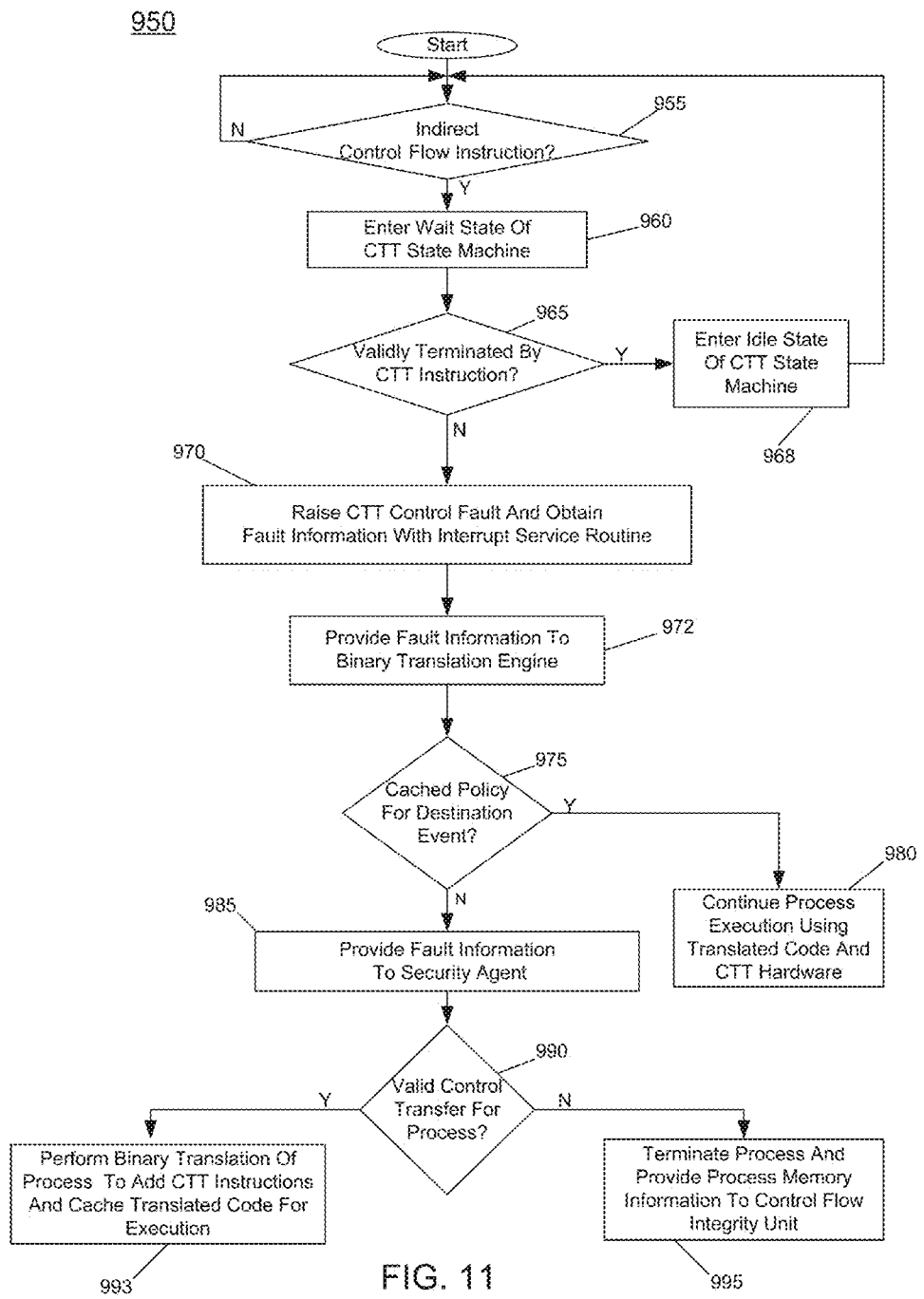
FIG. 11 is a flow diagram of a method for performing CTT handling in accordance with an embodiment of the present invention.

Referring now to FIG. 11, shown is a flow diagram of a method for performing CTT handling in accordance with an embodiment of the present invention. Method 950 may be performed by a collection of components, including a security VMM, a trusted OS portion, user level components, and processor hardware. Method 950 begins by determining whether an indirect control flow instruction is encountered during program execution (diamond 955). If so, control passes to block 960 where the CTT state machine state may be updated. More specifically, the CTT state machine may be controlled to enter into a wait state, as discussed above. Next at diamond 965 it is determined whether the indirect control flow instruction is correctly or validly terminated by a CTT instruction. Such valid termination occurs when the next instruction following the current control flow instruction is an appropriate CTT instruction (e.g., an ENDRET instruction after a RET instruction that ends a function). If such valid termination occurs, control passes to block 968 where the CTT state machine may enter into the idle state and continued execution of the given process occurs.

Otherwise, if an invalid termination determination is found at diamond 965, control passes to block 970 where a CTT control fault may be raised. More specifically, this fault may be raised to the interrupt service routine within a trusted portion of the OS, which receives the fault and appropriate fault information such as the process identifier, location of the fault and other information. Then at block 972, this fault information may be provided to the binary translation engine. Next at diamond 975 it is determined whether a cached policy for the destination event is present. For example, this destination event may be an initiation into a code block in which translated code that includes appropriate CTT instructions is provided. As such, control passes to block 980 where process execution may continue using the translated code and the CTT hardware.

Otherwise, if it is determined that no cached code exists, control passes instead to block 985, where fault information may be provided to a security agent. In turn, the security agent may access policy information associated with the given process. Next at diamond 990 it is determined whether a valid control transfer has occurred for the process. Such determination may be made with reference to this policy information available to the security agent. If so, this means that the executed code of the process is not translated code or otherwise instrumented to include appropriate CTT instructions, and thus on an indirect control flow instruction that is not properly terminated by appropriate CTT instruction, this fault occurs.

If the indirect control transfer is the desired operation of the code and not a result of malware or other security concern (e.g., as determined by policy), control passes to block 993 where a binary translation of the process may be performed to add CTT instructions. In an embodiment, the binary translation engine of the trusted user space may perform such translation and cache the translated code for future dynamic execution.

Otherwise, if an invalid control transfer occurred during the process, e.g., due to a ROP or other attack or malware, control passes to block 995 where the process may be terminated and process memory information may be provided to the control flow integrity unit, e.g., to prepare a report regarding the intrusion or attack. Understand that while shown at this high level in FIG. 11, many variations and alternatives are possible.

Figure 12:
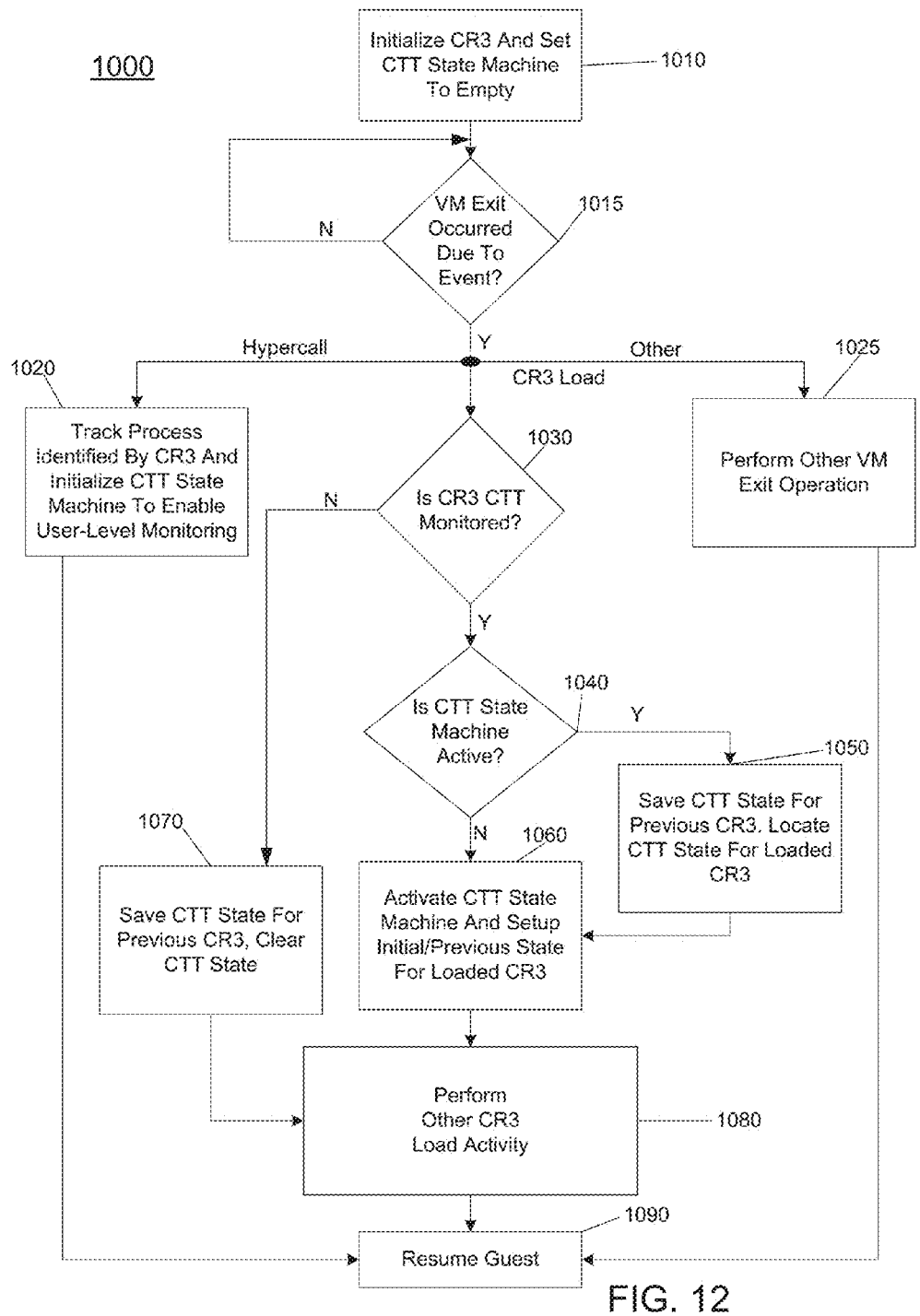
FIG. 12 is a flow diagram of a method for performing CTT operations in accordance with another embodiment of the present invention.

Referring to FIG. 12, shown is a flow diagram of a method for performing CTT operations in accordance with another embodiment of the present invention. As shown in FIG. 12, method 1000 may be performed by a collection of components, including a security VMM, a trusted OS portion, user level components, and processor hardware.

As seen, method 1000 begins by initializing certain state. More specifically, for a CR3 value associated with a given process the CTT state machine may be initialized and set to an idle state (block 1010). Next, it is determined whether a VM exit has occurred due to a given event (diamond 1015). If so, depending on the type of event, one of 3 different code paths may be performed. If the event is a hypercall, control passes to block 1020 where a process identified by this CR3 value may be tracked and the CTT state machine is initialized to enable user-level monitoring (block 1020). Thereafter, control passes to block 1090 where operation of the guest is resumed. If instead a VM exit occurred due to another type of event, a given operation appropriate for a particular event may be performed for this VM exit (block 1025), and thereafter execution of the guest may resume (again at block 1090).

Otherwise, if the given event is a CR3 load event, control passes to diamond 1030 to determine whether the CR3 value is a CTT monitored process. Although the scope of the present invention is not limited in this regard, in an embodiment this determination may be made with reference to a mapping table that associates CR3 values with a CTT monitor state. If it is determined that a given CR3 is not associated with CTT operation, control passes to block 1070 where a CTT state for the previously active process may be saved to an appropriate storage, and the CTT state may be cleared. Thereafter, control passes to block 1080 where any other activity for processing the CR3 load event may be performed, and thereafter guest execution resumes (at block 1090).

Still with reference to FIG. 12, otherwise if the CR3 is associated with CTT operation, control passes to diamond 1040 to determine whether the CTT state machine is active. If so, control passes to block 1050 where the CTT state for the previous process may be saved to an appropriate storage, and the CTT state for the present process may be located. Thereafter, control passes to block 1060 (also receiving control directly from diamond 1040 if the CTT state machine was not active for the previous process). At block 1060, the CTT state machine may be activated and an initial (or previous) state may be set up into the CTT state machine and associated configuration registers. Thereafter, any further activities for processing the CR3 load event are performed at block 1080 and thereafter guest execution is resumed at block 1090. Understand while shown at this high level in the embodiment of FIG. 12, many variations and alternatives are possible.

Embodiments thus provide 100% code coverage protection using CTT monitoring as described herein, while avoiding recompilation and performance/power loss of an approach that requires either full emulation/translation or invasive modifications to the compiler, and recompilation of the application to provide 100% coverage against ROP and JOP attacks which is prohibitive from a cost, performance and power perspective. Embodiments may thus be used to improve resiliency of software against zero-day/ROP/JOP attacks, and improve behavioral monitoring capabilities of host intrusion prevention software, without sacrificing performance/power. Embodiments may further provide detection of zero-day attacks without signatures or application modification (other than additional performance boost by a binary translation engine as described herein), and allow heuristics to be enabled for control flow integrity.

Figure 13:
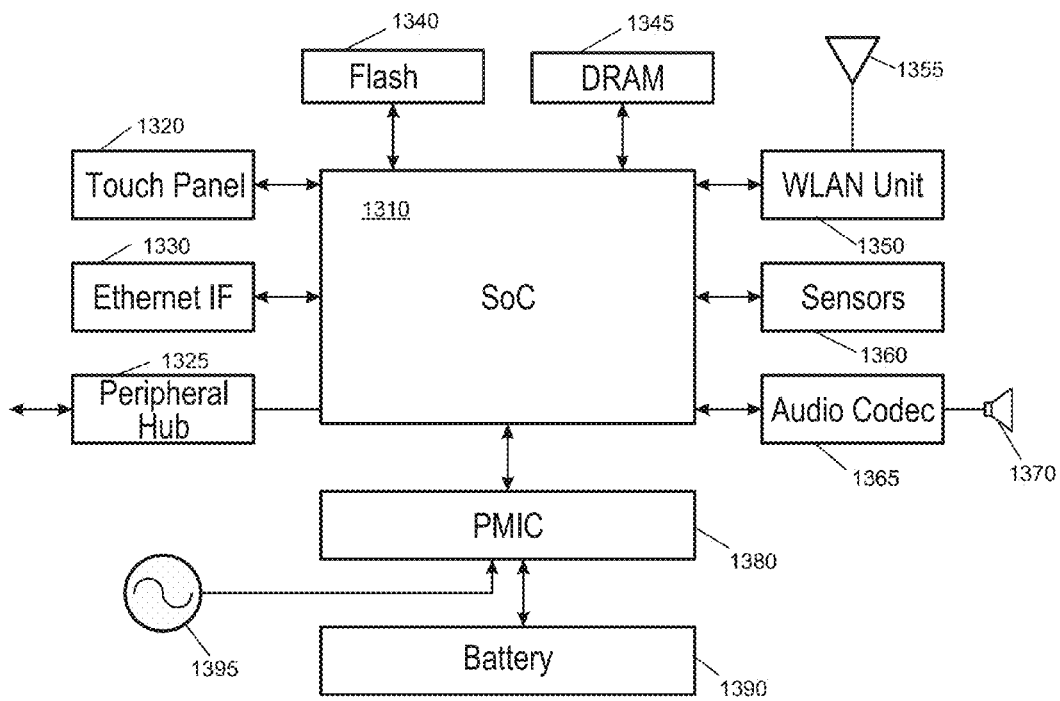
FIG. 13 is a block diagram of an example system with which embodiments may be used.

Referring now to FIG. 13, shown is a block diagram of an example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include CTT hardware, software, and/or firmware as described herein to provide protection against ROP and other security attacks.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
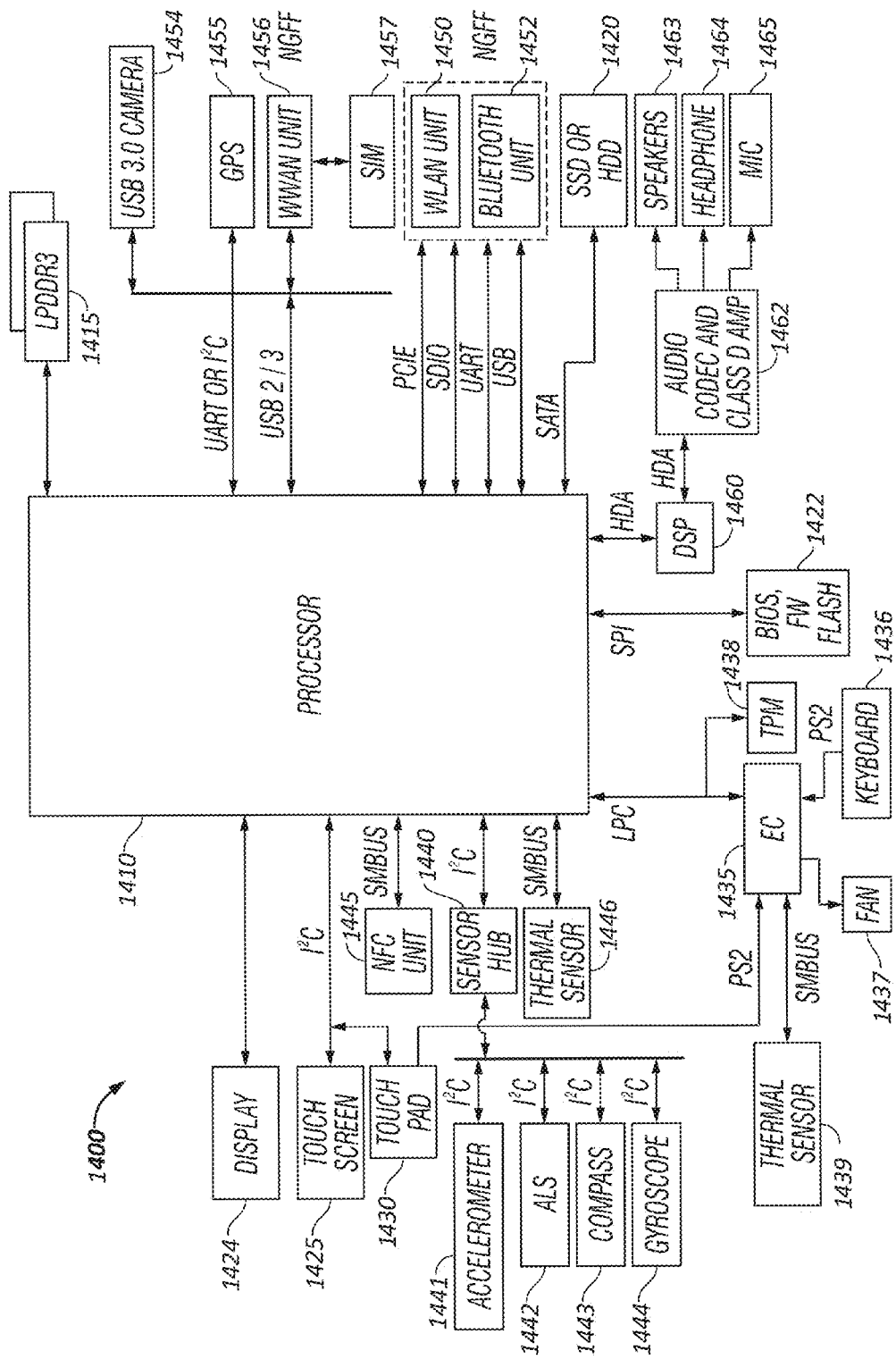
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include CTT hardware, software, and/or firmware as described herein to provide protection against ROP and other security attacks.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I²C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
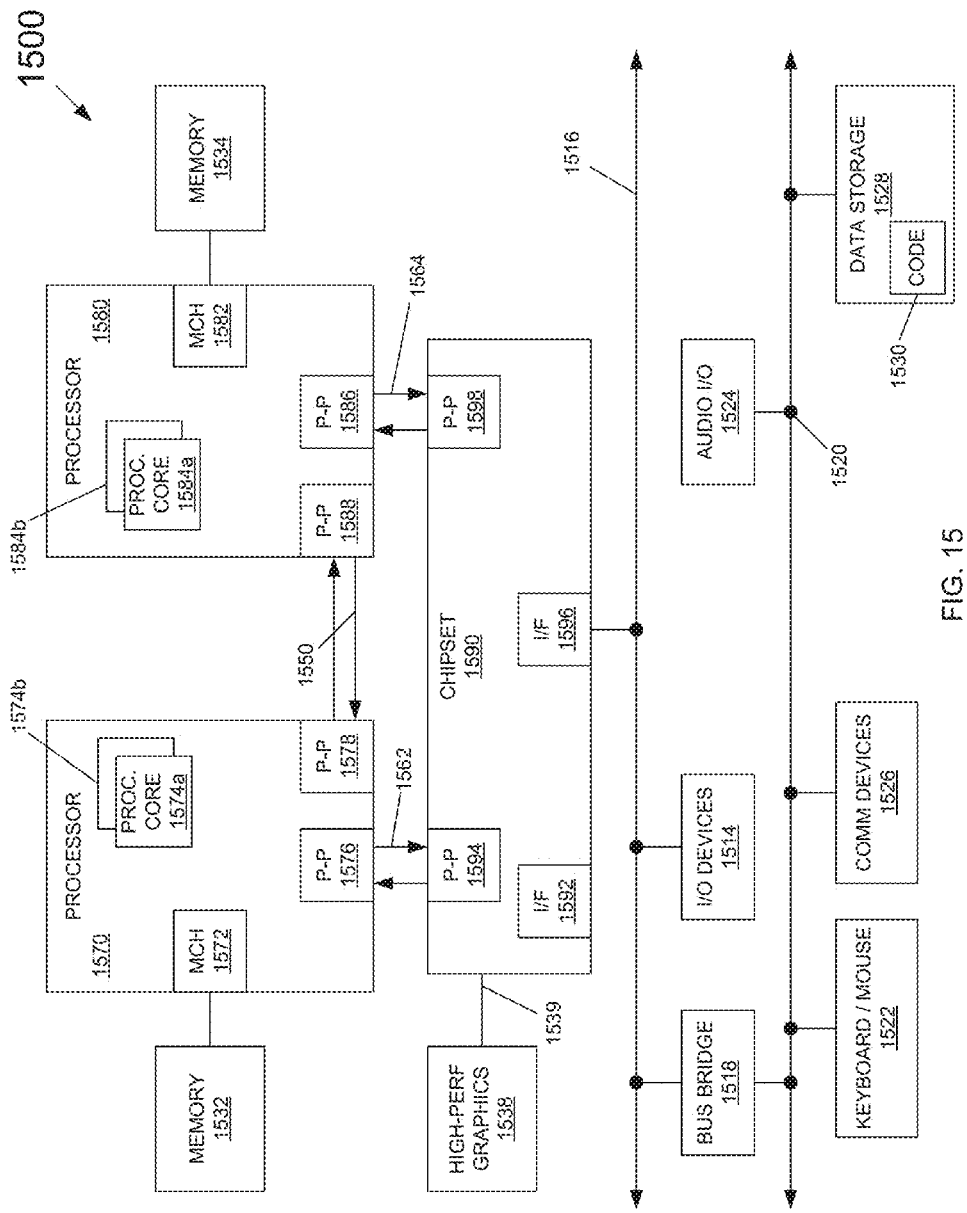
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include CTT hardware and logic to perform the security techniques described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, an apparatus comprises: a first storage to store an enable indicator for a CTT state machine and a state of the CTT state machine for a first privilege level; a second storage to store an enable indicator for the CTT state machine and a state of the CTT state machine for a second privilege level; the CTT state machine configured to operate in one of the first and second privilege levels, the CTT state machine to raise a fault when an indirect control transfer instruction of a process is not terminated by a CTT instruction, where a VMM is to selectively enable the CTT state machine for the process; and a binary translation engine to receive fault information associated with a fault raised by the CTT state machine, provide at least some of the fault information to a security agent associated with the process, and responsive to direction from the security agent, translate a code block of the process to a translated code block including a first CTT instruction associated with the indirect control transfer instruction, where when the translated code block including the indirect control transfer instruction and the first CTT instruction is to be executed, the CTT state machine will not raise a fault.

In Example 2, the VMM of Example 1 is to initialize a fault handler in a trusted portion of an operating system (OS) to handle the fault raised by the CTT state machine.

In Example 3, the fault handler of Example 2 is to receive the fault and to provide the fault information to the binary translation engine.

In Example 4, the VMM of one of the above Examples optionally is to initialize the security agent associated with the process in a trusted portion of an application including the process.

In Example 5, the VMM of Example 4 optionally is to initialize the binary translation engine in the trusted portion of the application.

In Example 6, the VMM of one of the above Examples optionally comprises a control flow integrity unit to determine whether a process identifier of the process is associated with CTT state and if so, to load the CTT state into the first storage and to enable the CTT state machine.

In Example 7, responsive to a VM exit from the process, the VMM is to store the enable indicator and the CTT state from the first storage to a virtual machine control structure.

In Example 8, the apparatus of one of the above Examples optionally further comprises a cache memory to store a plurality of translated code blocks, where the binary translation engine is to store the translated code block to the cache memory.

In Example 9, in the apparatus of one of the above Examples 1, the VMM is to selectively enable the CTT state machine for the process, the process at least a portion of a browser, and to selectively disable the CTT state machine for a second process, the second process at least a portion of a local application.

In Example 10, a system comprises: a processor having an execution logic to execute instructions; a cache memory coupled to the execution logic; a CTT logic coupled to the execution logic, where the CTT logic is to cause a CTT fault to be raised if a target instruction of a control transfer instruction is not a CTT instruction, and to provide fault information regarding the CTT fault to a binary translation engine, the binary translation engine to perform a binary translation of a code segment including the target instruction into a translated code segment including a CTT instruction to be associated with the control transfer instruction, and to store the translated code segment in the cache memory. The system further includes a DRAM coupled to the processor.

In Example 11, the processor of Example 10 comprises a retirement unit to raise the CTT fault after retirement of the CTT instruction.

In Example 12, the system of Example 10 optionally further comprises a control flow transfer integrity unit coupled to the CTT logic, the control flow transfer integrity unit to selectively enable the CTT logic.

In Example 13, the CTT logic of Example 12 optionally comprises an interrupt service routine to be executed in a trusted portion of an OS, where the CTT logic is to raise the CTT fault to the interrupt service routine and the interrupt service routine is to provide the fault information to the binary translation engine.

In Example 14, the processor of Examples 12 or 13 is to execute a VMM including the control flow transfer integrity unit to initialize the CTT logic responsive to association of a process identifier of the code segment to a state for the CTT logic.

In Example 15, the control flow transfer integrity unit of Example 14 is to initialize the CTT logic with the state and to thereafter transfer control to a user level for execution of the code segment.

In Example 16, the user level of Example 15 includes a trusted portion having the binary translation engine and a security agent, the security agent to inform the binary translation engine, responsive to the CTT fault, whether the target instruction is an intended instruction, and if so, the binary translation engine is to perform the binary translation of the code segment.

In Example 17, the VMM of Example 16 is to raise a fault and terminate the process if the target instruction is not an intended instruction.

In Example 18, at least one computer readable storage medium comprises instructions that when executed enable a system to: install a CTT fault handler in a trusted partition of a memory; initialize security policy information for a security agent of a trusted user space; initialize a binary translation engine of the trusted user space; determine whether a process identifier for a process to be executed on a processor is associated with a CTT state, the processor having a CTT state machine configured to cause a CTT fault when an indirect control transfer instruction of the process is not terminated by a CTT instruction; and if the process identifier is associated with the CTT state, load the CTT state into a CTT configuration storage of the processor and enable the CTT state machine, and thereafter begin execution of the process.

In Example 19, the at least one computer readable medium of Example 18 further comprises instructions that when executed cause the system, if the process identifier is not associated with the CTT state, to begin execution of the process without the CTT state load and the CTT state machine enabling.

In Example 20, the at least one computer readable medium of Example 18 further comprises instructions that when executed cause the system to determine, responsive to a CTT fault, whether a target instruction of an indirect control transfer instruction is an intended instruction, and if so, to perform a binary translation of a code segment of the process including the target instruction via the binary translation engine, and if not, to raise a fault, gather information and terminate the process.

In Example 21, a method comprises: installing a CTT fault handler in a trusted partition of a memory; initializing security policy information for a security agent of a trusted user space; initializing a binary translation engine of the trusted user space; determining whether a process identifier for a process to be executed on a processor is associated with a CTT state, the processor having a CTT state machine configured to cause a CTT fault when an indirect control transfer instruction of the process is not terminated by a CTT instruction; and if the process identifier is associated with the CTT state, loading the CTT state into a CTT configuration storage of the processor and enable the CTT state machine, and thereafter beginning execution of the process.

In Example 22, the method of Example 21 optionally further comprises if the process identifier is not associated with the CTT state, beginning execution of the process without the CTT state load and the CTT state machine enabling.

In Example 23, the method of Example 22 optionally further comprises determining, responsive to a CTT fault, whether a target instruction of an indirect control transfer instruction is an intended instruction, and if so, performing a binary translation of a code segment of the process including the target instruction via the binary translation engine, and if not, raising a fault, gathering information and terminating the process.

In Example 24, a machine-readable storage medium includes machine-readable instructions, when executed, to implement a method of any one of Examples 21-23.

In Example 25, an apparatus comprises: means for installing a CTT fault handler in a trusted partition of a memory; means for initializing security policy information for a security agent of a trusted user space; means for initializing a binary translation engine of the trusted user space; means for determining whether a process identifier for a process to be executed on a processor is associated with a CTT state, the processor having a CTT state machine configured to cause a CTT fault when an indirect control transfer instruction of the process is not terminated by a CTT instruction; and means for, if the process identifier is associated with the CTT state, loading the CTT state into a CTT configuration storage of the processor and enabling the CTT state machine, and thereafter beginning execution of the process.

In Example 26, the apparatus of Example 25 optionally further comprises means for, if the process identifier is not associated with the CTT state, beginning execution of the process without the CTT state load and the CTT state machine enabling.

In Example 27, the apparatus of Example 25 optionally further comprises: means for determining, responsive to a CTT fault, whether a target instruction of an indirect control transfer instruction is an intended instruction; means for performing a binary translation of a code segment of the process including the target instruction via the binary translation engine; means for raising a fault; means for gathering information; and means for terminating the process.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first storage to store an enable indicator for a control transfer termination (CTT) state machine and a state of the CTT state machine for a first privilege level;
a second storage to store an enable indicator for the CTT state machine and a state of the CTT state machine for a second privilege level;
the CTT state machine configured to operate in one of the first and second privilege levels, the CTT state machine to raise a fault when an indirect control transfer instruction of a process is not terminated by a CTT instruction, wherein a virtual machine monitor (VMM) is to selectively enable the CTT state machine for the process; and
a binary translation engine to receive fault information associated with a fault raised by the CTT state machine, provide at least some of the fault information to a security agent associated with the process, and responsive to direction from the security agent, translate a code block of the process to a translated code block to insert a first CTT instruction associated with the indirect control transfer instruction, wherein when the translated code block including the indirect control transfer instruction and the first CTT instruction is to be executed, the CTT state machine will not raise a fault.

2. The apparatus of claim 1, wherein the VMM is to initialize a fault handler in a trusted portion of an operating system (OS) to handle the fault raised by the CTT state machine.

3. The apparatus of claim 2, wherein the fault handler is to receive the fault and to provide the fault information to the binary translation engine.

4. The apparatus of claim 2, wherein the VMM is to initialize the security agent associated with the process in a trusted portion of an application including the process.

5. The apparatus of claim 4, wherein the VMM is to initialize the binary translation engine in the trusted portion of the application.

6. The apparatus of claim 1, wherein the VMM comprises a control flow integrity unit to determine whether a process identifier of the process is associated with CTT state and if so, to load the CTT state into the first storage and to enable the CTT state machine.

7. The apparatus of claim 6, wherein responsive to a virtual machine (VM) exit from the process, the VMM is to store the enable indicator and the CTT state from the first storage to a virtual machine control structure.

8. The apparatus of claim 1, further comprising a cache memory to store a plurality of translated code blocks, wherein the binary translation engine is to store the translated code block to the cache memory.

9. The apparatus of claim 1, wherein the VMM is to selectively enable the CTT state machine for the process, the process at least a portion of a browser, and to selectively disable the CTT state machine for a second process, the second process at least a portion of a local application.

10. A system comprising:
a processor comprising:
an execution logic to execute instructions;
a cache memory coupled to the execution logic;
a control transfer termination (CTT) logic coupled to the execution logic, wherein the CTT logic is to cause a CTT fault to be raised if a target instruction of a control transfer instruction is not a CTT instruction, and to provide fault information regarding the CTT fault to a binary translation engine, the binary translation engine to perform a binary translation of a code segment including the target instruction into a translated code segment to insert a CTT instruction to be associated with the control transfer instruction, and to store the translated code segment in the cache memory; and
a dynamic random access memory (DRAM) coupled to the processor.

11. The system of claim 10, wherein the processor further comprises a retirement unit, the retirement unit to raise the CTT fault after retirement of the CTT instruction.

12. The system of claim 10, further comprising a control flow transfer integrity unit coupled to the CTT logic, the control flow transfer integrity unit to selectively enable the CTT logic.

13. The system of claim 12, wherein the CTT logic comprises an interrupt service routine, the interrupt service routine to be executed in a trusted portion of an operating system (OS), wherein the CTT logic is to raise the CTT fault to the interrupt service routine and the interrupt service routine is to provide the fault information to the binary translation engine.

14. The system of claim 13, wherein the processor is to execute a virtual machine monitor (VMM), the VMM including the control flow transfer integrity unit, the control flow transfer integrity unit to initialize the CTT logic responsive to association of a process identifier of the code segment to a state for the CTT logic.

15. The system of claim 14, wherein the control flow transfer integrity unit is to initialize the CTT logic with the state and to thereafter transfer control to a user level for execution of the code segment.

16. The system of claim 15, wherein the user level includes a trusted portion having the binary translation engine and a security agent, the security agent to inform the binary translation engine, responsive to the CTT fault, whether the target instruction is an intended instruction, and if so, the binary translation engine is to perform the binary translation of the code segment.

17. The system of claim 16, wherein the VMM is to raise a fault and terminate the process if the target instruction is not an intended instruction.

18. At least one computer readable storage medium comprising instructions that when executed enable a system to:
install a control transfer termination (CTT) fault handler in a trusted partition of a memory;
initialize security policy information for a security agent of a trusted user space;
initialize a binary translation engine of the trusted user space;
determine whether a process identifier for a process to be executed on a processor is associated with a CTT state, the processor having a CTT state machine configured to cause a CTT fault when an indirect control transfer instruction of the process is not terminated by a CTT instruction; and
if the process identifier is associated with the CTT state, load the CTT state into a CTT configuration storage of the processor and enable the CTT state machine, and thereafter begin execution of the process.

19. The at least one computer readable medium of claim 18, further comprising instructions that when executed cause the system, if the process identifier is not associated with the CTT state, to begin execution of the process without the CTT state load and the CTT state machine enabling.

20. The at least one computer readable medium of claim 18, further comprising instructions that when executed cause the system to determine, responsive to a CTT fault, whether a target instruction of an indirect control transfer instruction is an intended instruction, and if so, to perform a binary translation of a code segment of the process including the target instruction to insert a CTT instruction via the binary translation engine, and if not, to raise a fault, gather information and terminate the process.

* * * * *